(12) United States Patent
Raouda El-Balah

(10) Patent No.: US 10,929,821 B2
(45) Date of Patent: Feb. 23, 2021

(54) METHOD OF MANAGING PAYMENT INDEPENDENT DIGITIZED TRANSACTION RECEIPTS BETWEEN A BUYER AND MULTIPLE SELLERS

(71) Applicant: Hani Raouda El-Balah, Chicago, IL (US)

(72) Inventor: Hani Raouda El-Balah, Chicago, IL (US)

(73) Assignee: Hani Raouda El-Balah, Chicago, IL (US)

( * ) Notice: Subject to any disclaimer, the term of this patent is extended or adjusted under 35 U.S.C. 154(b) by 253 days.

(21) Appl. No.: 15/806,154

(22) Filed: Nov. 7, 2017

(65) Prior Publication Data

US 2018/0137478 A1 May 17, 2018

Related U.S. Application Data

(63) Continuation of application No. 15/571,774, filed as application No. PCT/US2016/031314 on May 6, 2016, now Pat. No. 10,755,240.

(Continued)

(51) Int. Cl.
*G06Q 20/04* (2012.01)
*G06Q 20/32* (2012.01)
(Continued)

(52) U.S. Cl.
CPC .......... *G06Q 20/047* (2020.05); *G06Q 20/12* (2013.01); *G06Q 20/20* (2013.01); *G06Q 20/209* (2013.01);
(Continued)

(58) Field of Classification Search
CPC .. G06Q 20/047; G06Q 20/327; G06Q 20/209; G06Q 20/12; G06Q 20/20; G06Q 30/0204; G06Q 30/0641
See application file for complete search history.

(56) References Cited

U.S. PATENT DOCUMENTS 6,487,540 B1 * 11/2002 Smith .................... G06Q 20/02
705/21
7,748,621 B2 * 7/2010 Gusler ................. G06Q 20/047
235/383

(Continued)

OTHER PUBLICATIONS

Todorovic, Natasa, G-Receipt—interaction through the receipt www.natasatod.com/greceipts, Retrieved Dec. 2019 (Year: 2019).*

(Continued)

*Primary Examiner* — Scott L Jarrett
(74) *Attorney, Agent, or Firm* — Sandberg Phoenix & von Gontard, P.C.

(57) ABSTRACT

The present disclosure is directed to a system and method for generating, securely storing, retrieving, and processing sales receipts for the purchase of goods and services using any convenient method of payment, with all buyer purchases being linked to their receipt account, that is independent of the seller's account or the payment account, providing both physical and electronic receipts with any receipt being readily identifiable by a purchaser, seller, credit card issuer, employer, financial institution, or other party or entity having a need to access the receipt and information included on it, and having a new taxonomy to characterize attributes of vendor independent and payment independent purchase receipts and employs and an analytics capability useful by buyers, sellers, and third parties.

24 Claims, 16 Drawing Sheets

Related U.S. Application Data

(60) Provisional application No. 62/418,621, filed on Nov. 7, 2016, provisional application No. 62/157,711, filed on May 6, 2015.

(51) Int. Cl.
  *G06Q 20/20* (2012.01)
  *G06Q 20/12* (2012.01)
  *G06Q 30/02* (2012.01)
  *G06Q 30/06* (2012.01)

(52) U.S. Cl.
  CPC ....... *G06Q 20/327* (2013.01); *G06Q 30/0204* (2013.01); *G06Q 30/0641* (2013.01)

(56) References Cited

U.S. PATENT DOCUMENTS

| | | | | |
|---|---|---|---|---|
| 8,359,245 | B1* | 1/2013 | Ballaro | G06Q 10/087 705/27.1 |
| 8,392,288 | B1* | 3/2013 | Miller | G06Q 40/02 705/26.1 |
| 8,429,038 | B1* | 4/2013 | Harman | G06Q 20/209 705/30 |
| 8,620,755 | B1* | 12/2013 | Argue | G06Q 30/04 235/380 |
| 9,330,382 | B2* | 5/2016 | Argue | G06Q 20/0453 |
| 9,373,230 | B2* | 6/2016 | Argue | G06Q 20/20 |
| 9,576,320 | B2* | 2/2017 | Bennett | G06Q 30/0207 |
| 9,595,024 | B2* | 3/2017 | Argue | G06Q 20/0453 |
| 10,192,217 | B1* | 1/2019 | Ellis | G06Q 20/363 |
| 10,235,668 | B1* | 3/2019 | Ellis | G06Q 20/363 |
| 10,242,326 | B2* | 3/2019 | Arthur | G06Q 20/105 |
| 10,332,214 | B2* | 6/2019 | Freeman | G06Q 40/12 |
| 10,366,374 | B2* | 7/2019 | Park | G06F 1/1626 |
| 10,489,756 | B2* | 11/2019 | Britt | G06Q 20/20 |
| 10,755,240 | B2* | 8/2020 | Raouda El-Balah | G06Q 30/0641 |
| 2002/0022967 | A1* | 2/2002 | Ohkado | G06Q 10/08 705/26.1 |
| 2004/0220964 | A1* | 11/2004 | Shiftan | G06Q 10/087 |
| 2005/0060437 | A1* | 3/2005 | Doyle | G06Q 30/06 710/1 |
| 2007/0164106 | A1* | 7/2007 | McDevitt | G06Q 20/0453 235/383 |
| 2007/0189542 | A1* | 8/2007 | Alldredge | G06Q 20/02 380/283 |
| 2009/0076967 | A1* | 3/2009 | Fields | G06Q 20/3674 705/76 |
| 2009/0100017 | A1* | 4/2009 | Graves | G06Q 40/02 |
| 2009/0234708 | A1* | 9/2009 | Heiser, II | G06Q 30/02 705/14.17 |
| 2009/0234715 | A1* | 9/2009 | Heiser, II | G06Q 30/02 705/14.17 |
| 2012/0290609 | A1* | 11/2012 | Britt | G06Q 20/0453 707/769 |
| 2013/0103481 | A1* | 4/2013 | Carpenter | G06Q 30/0229 705/14.25 |
| 2013/0151344 | A1* | 6/2013 | Tavares | G06Q 30/00 705/14.65 |
| 2013/0275299 | A1* | 10/2013 | Yang | G06Q 20/0453 705/41 |
| 2014/0006198 | A1* | 1/2014 | Daly | G06Q 30/06 705/24 |
| 2014/0012691 | A1* | 1/2014 | Hanson | G06Q 20/42 705/21 |
| 2014/0067568 | A1* | 3/2014 | Argue | G06Q 10/08 705/21 |
| 2014/0067676 | A1* | 3/2014 | Woodall | G06Q 20/322 705/44 |
| 2014/0074675 | A1* | 3/2014 | Calman | G06Q 40/12 705/35 |
| 2014/0095985 | A1* | 4/2014 | Argue | G06Q 20/0453 715/243 |
| 2014/0180826 | A1* | 6/2014 | Boal | G06Q 20/209 705/14.66 |
| 2014/0236714 | A1* | 8/2014 | Fukasawa | G06Q 30/0253 705/14.51 |
| 2014/0249909 | A1* | 9/2014 | Gotanda | G06Q 20/045 705/14.27 |
| 2014/0249970 | A1* | 9/2014 | Susaki | G06Q 10/10 705/30 |
| 2014/0249997 | A1* | 9/2014 | Susaki | G06Q 10/10 705/39 |
| 2014/0249998 | A1* | 9/2014 | Gotanda | G07G 5/00 705/39 |
| 2014/0337150 | A1* | 11/2014 | Anand | G06Q 20/045 705/16 |
| 2015/0039479 | A1* | 2/2015 | Gotanda | G07G 1/14 705/30 |
| 2015/0142593 | A1* | 5/2015 | Chauhan | G06Q 20/202 705/21 |
| 2015/0356538 | A1* | 12/2015 | Okada | G06Q 20/204 705/17 |
| 2015/0356540 | A1* | 12/2015 | Sugiyama | G06Q 20/209 705/21 |
| 2016/0155203 | A1* | 6/2016 | Gotanda | G06Q 40/128 705/33 |
| 2016/0217509 | A1* | 7/2016 | Eggleston, IV | G06Q 30/0283 |
| 2016/0379187 | A1* | 12/2016 | Wijngaarden | G06Q 20/322 705/40 |
| 2017/0017945 | A1* | 1/2017 | Nimiya | G06Q 20/18 |
| 2017/0017980 | A1* | 1/2017 | Sakurai | G06Q 20/10 |
| 2017/0124580 | A1* | 5/2017 | Sharma | G06Q 40/12 |

OTHER PUBLICATIONS

PCT Search Report, PCT/US2016/031314, dated Aug. 18, 2016.
PCT Written Opinion, PCT/US2016/031314, dated Aug. 18, 2016.

* cited by examiner

METHOD OF MANAGING PAYMENT INDEPENDENT DIGITIZED TRANSACTION RECEIPTS BETWEEN A BUYER AND MULTIPLE SELLERS

CROSS-REFERENCE TO RELATED APPLICATIONS

This application is a continuation-in-part application of U.S. National Stage application Ser. No. 15/571,774, as filed on Nov. 3, 2017, which claimed priority to PCT/US16/31314, filed on May 6, 2016, that claims the benefit of U.S. Provisional Application No. 62/157,711, filed on May 6, 2015.

This application also claims priority to U.S. Provisional Application No. 62/418,621, filed on Nov. 7, 2016.

The disclosures of each of these priority applications being incorporated herein by reference.

FIELD

The present disclosure relates to the purchasing of goods and services through various venues; i.e., points of sale (POS) and more specifically, to a system and a method of issuing receipts for any purchased product or service at a POS through a variety of mechanisms that enable subsequent, post-sale accessing of the receipt by the purchaser, POS entity, credit card service, etc., for verification of a purchase, return of a product, and business or financial tracking purposes.

BACKGROUND OF THE DISCLOSURE

Currently, purchasing goods or services involves selecting items of interest and then paying for them using one of a variety of methods including cash, credit cards, debit cards, electronic wallets (E-wallets), under-skin chip technologies, Apple pay, Samsung pay, Bitcoin, as well as others. Depending upon how items are purchased, payments are made in diverse ways including, but not limited to, online payments, physical payment to a cashier, physical payment with cashier-less checkout machines etc. Some newer methods of payment include pre-sale options that a customer may opt to use so long as they have the appropriate prerequisites and resources to successfully complete a payment transaction. Heretofore, when items are purchased, the customer receives a paper receipt or a digital receipt usually incorporated in the body of an email.

A receipt is the only authentic proof a purchaser has for the value of the amount they spend on a purchase. Paper receipts have been in use since long before the advent of computers and computer systems. Before then they were the norm and were the only post-sale evidence providing a proof of purchase to those buying/renting/leasing products and services. With the now prevalent use of computers and the wide diversity in point-of-sale or POS systems used, together with the wide diversity of payment methods noted above, it is difficult to have a common digital receipt alternative to paper receipts, even with the tremendous inefficiencies paper receipts have.

A major problem with the current process is the manual labor required in managing receipts whether for personal purposes, corporate expenses, or household budgeting. Therefore, an assumption behind the concept of this disclosure is that most people are tired of handling paper receipts and the excessive effort needed to be spent on scanning them into some type of digital format and then compiling and sorting them. This does not include the additional effort in retrieving them when an item has to be returned or exchanged, when tax filings have to be prepared, as well as for budgeting and determining spending patterns.

Now, new POS systems are beginning to move away from paper receipts by implementing techniques such as emailing receipts (electronic or E-receipts) as noted above, or even sending them within short message service (SMS) messages. A problem with these newer approaches is they require people to enter their email or phone credentials upon every sale, which is cumbersome and not very appealing to the average purchaser. Also, cashiers now have to verbally ask a consumer if they actually need a paper receipt. This is done in an effort for the store to save on paper and ink for purchasers who do not care for a paper receipt with their purchase. Also, many consumers are indifferent to obtaining a paper receipt since most people tend to lose these pieces of papers or throw them away anyway.

Further regarding email receipts, they mostly arrive with numerous other emails and so have to be manually searched, and when found, classified.

As shown in FIG. 1, a current prior art seller and buyer transaction processing system 100 is shown having multiple seller systems 102A (SA), 102B (SB), and 102N (SN) (three shown by way of example only) with each having a single buyer B shown as Bx, By, and Bz (as well as indicated by 106-1, 106-2 and 106-3) at each respective seller system locations 102A, 102B, and 102N. The sellers 101 can be a physical seller or an e-commerce seller. As shown, buyer Bx 106-1 is purchasing purchased products (PP) 112X shown as purchased products PPX1, PPX2 and PPXN by way of example. The Buyer Bx submits transaction payment TP1 114A to the seller purchase user interface (UI) 104A, which can be a person at a check out counter or an on-line web-site, via a purchase transaction 105A. The seller UI is coupled to Seller A's system (SA) 102A purchase processing system (PPSA) 108A such as a point of sale (POS) terminal. The POS system 108A can accept cash, or any other means of payment and in some cases transmits a financial transaction request 118 to a seller financial transaction processing system FS1 110A. The financial transaction processing system 110A can validate the financial payment part of the transaction such as if by credit card, debit card, e-wallet, PayPal™, bitcoin, or any other suitable means for transaction payment as currently known or as may be developed from time to time. The purchase processing system PPSA 108A provides the seller UI 104A with an acceptance of the transaction payment 114A. At that point, the user interface 104A either directly, or through use of a cash register or payment device of the seller UI 104A, either prints out a paper transaction receipt TR1 116 that is then provided to the buyer 106-1. This can also include prompting the buyer 106 or providing the buyer 106 with a PDF or scanned copy as the transaction receipt 116A.

This process is repeated at each brick and mortar seller location, for each location of each seller and for each and every buyer at each seller.

As shown, buyer By 106-2 is purchasing purchased products (PP) 112Y shown as purchased products PPY1, PPY2 and PPYN by way of example. The Buyer By submits transaction payment TP2 114B to the seller purchase user interface (UI) 104B, which will be a different person or checkout counter or on-line web-site via a purchase transaction 105B. The seller UI is coupled to Seller B (SB) 102B purchase processing system (PPSB) 108B such as a point of sale (POS) terminal. The POS system 108B can accept cash, or any other means of payment and in some cases transmits a financial transaction request 118 to a remote financial system FS2 110B. The financial system 110B validates the transaction by any suitable means which is often different but could be the same as addressed. The purchase processing system PPSB 108B provides the seller purchase UI 104B with an acceptance of the transaction payment 114B. At that point, the seller user interface 104B either directly, or through use of a cash register or payment device of the seller purchase UI 104B, either prints out a paper transaction receipt or emailed PDF receipt TR2 116. And similarly, buyer Bz 106-N is purchasing purchased products (PP) 112Z shown as purchased products PPZ1, PPZ2 and PPZN by way of example. The Buyer Bz 106-N submits transaction payment TP3 114N to the seller purchase user interface (UI) 104N via a purchase transaction 105N. The seller UI is coupled to Seller N (SN) 102N purchase processing system (PPSN) 108N such as a point of sale (POS) terminal. The POS system 108N accepts any form of payment and transmits as may be required by a financial transaction request 118 to a remote financial system FS3 110N. The financial system 110N can validate the transaction using any other suitable means for transaction payment 114. The purchase processing system PPSN 108N provides the seller purchase user UI 104N with an acceptance of the transaction payment 114N. At that point, the seller purchase user interface 104N either directly or through use of a cash register or payment device of the seller purchase user UI 104N, either prints out a paper transaction receipt TR3 116 that is then provided to the buyer 106-3. This can also include prompting the buyer 106 or providing the buyer 106 with an PDF or scanned copy as the transaction receipt 116N

As addressed herein, each and every seller 101 has a seller system 102A, 102B, and 102N that can include or be composed of a different and standalone and non-compatible seller purchase processing system 108A, 108B, and 108N and each provides a different transaction receipt TR1 116A, TR1 116B, and TRN 116N. None of the purchase processing systems 108 (108A, 108B, and 108N) are common and they do not share information. All of the transaction receipts 116 (116A, 116B and 116N) are different, have different information, and are either paper or emailed PDF copies that the each Buyer 106-1, 106-2 and 106-N must separately administer and manage. In some instances each Buyer 106-1, 106-2 and 106-N at each seller system 102A, 102B, and 102N is the same person, but they receive separate and completely different transactions receipts 116A, 116B and 116N from each of the sellers 102A, 102B and 102N.

Summarizing the above, and as shown in FIG. 1, there are now two main barriers to the emergence of a truly digital receipt solution for verifying or recording consumer purchases. One is the diversity of POS systems, and the other is diversity of payment methods. The present disclosure addresses both issues. Importantly, as technology evolves, and in particular now that Software as a Service (SaaS) and Cloud technologies are becoming more prevalent, it is no longer necessary to issue paper or even email receipts, even though they will continued to be used. Nonetheless, because issues such as a purchaser's verification of what they bought, product returns, and individual as well as supplier and credit issuers business and financial tracking requirements need to be addressed, there is a need to conveniently track, store, and access any issued receipts.

SUMMARY OF THE DISCLOSURE

The present disclosure is directed to a system and method for generating, securely storing, retrieving, and processing sales receipts for the purchase of goods and services using any convenient method of payment. All buyer purchases are linked to their receipt account or account. The method includes the generation of both physical and electronic receipts with any receipt being readily identifiable by a purchaser, seller, credit card issuer, employer, financial institution, or other party or entity having a need to access the receipt and information included on it.

The digital receipts system and method referred sometimes herein as G-Receipts™, is a new, novel consumer-centric classified and centralized solution to Paper/Email/SMS Receipts regardless of stores, purchases, methods of payment and POS systems. As described here, a digital receipt is an authentic receipt showing proof of the value spent by a purchaser, in contrast to simply being a scanned image or a PDF. As described herein, the system is ubiquitous as to the type of payment used or the selling entity, and as such provides the consumer a complete receipt authenticated record of all receipts for all purchases. The system enables a consumer to find any receipt in a single click and use an application itself for any receipt related operations like exchanges, returns, tips, etc. Further, as provided herein, the system and service provides for corporate level, household or group aggregation and analytics by provided parent/child automated receipt management and administration. While provide consumers and sellers such as retailers with common receipt management system, that can be implemented such as software as a service (SaaS), the system and method provides for complete privacy for the consumer as to each transaction and transaction content. As described in various embodiments, this new system based service functionality provides both consumers and sellers with this new capability without requiring substantial manual effort by either to use or operate as it can be integrated with existing practices and systems (seller hardware and software), but that adds never before provided functionality thereto.

As described herein, various aspects of the system and method includes not only a ubiquitous vendor and payment independent receipt service for all purchases, but enables a user or consumer to later find the receipt, void a receipt, sign a receipt, add a tip or link a product or service warranty to the receipt.

In one aspect, a method of providing a payment and seller independent electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising, in a seller digital transaction system communicatively coupled to the seller's purchase payment processing system and an output interface, performing the steps of storing a seller's digital receipts identifier uniquely identifying the seller from among a plurality of non-related and non-associated sellers, receiving a buyer's digital receipt identifier that uniquely identifies the buyer within the digital receipts transaction processing system and receiving purchase transaction data from the seller's purchase payment processing system which includes transaction receipt data including data related to the purchased item or items, a price, and payment amount, but which does not include personalized data providing an identity of the buyer. The process also includes assigning a transaction digital receipt number to the received purchase transaction data that uniquely identifies the seller and the purchase transaction, formatting a digital transaction receipt including the assigned transaction digital receipt number, the received seller's digital receipt identifier, the buyer's digital receipt identifier, and the transaction receipt data, and transmitting the digital transaction receipt over the output interface. The method also includes, in a digital receipts transaction processing system having a seller input interface communicatively coupled to an output interface and receiving a transmitted digital transaction receipt, a buyer digital receipt output interface communicatively coupled to a buyer digital receipt memory store dedicated and unique to the buyer and identified by a buyer's digital receipt identifier, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of transmitting, in near real time to receipt of the digital transaction receipt, a copy of the received digital transaction receipt to either the buyer's e-contact address or the seller digital transaction system and receiving, within a transaction window a buyer's purchase receipt, confirmation message from the buyer's e-contact address or the seller digital transaction system in response to the transmitted digital transaction receipt thereto. The method also includes storing the buyer's digital receipt identifier, and a buyer e-contact address, and the seller's digital receipts identifier. Further the method includes that in response to receiving the confirmation message performing the steps of transmitting a seller confirmation message to the seller digital transaction system and transmitting a first copy of the digital transaction receipt to the buyer digital receipt memory over the buyer digital receipt output interface. The method also includes transmitting a second copy of the digital transaction receipt to the seller digital receipt memory over the seller digital receipt output interface, and deleting from the digital receipts system memory the received digital transaction receipt.

In another aspect, a method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising in a seller digital transaction system communicatively coupled to the seller's purchase payment processing system and an output interface, performing the steps of storing a seller's digital receipts identifier uniquely identifying the seller from among a plurality of non-related and non-associated sellers, and receiving a buyer's digital receipt identifier that uniquely identifies the buyer within the digital receipts transaction processing system. The method also includes receiving purchase transaction data from the seller's purchase payment processing system which includes transaction receipt data including data related to the purchased item or items, a price, and payment amount, but which does not include personalized data providing an identity of the buyer and assigning a transaction digital receipt number to the received purchase transaction data that uniquely identifies the seller and the purchase transaction. The method also includes formatting a digital transaction receipt including the assigned transaction digital receipt number, the received seller's digital receipt identifier, the buyer's digital receipt identifier, and the transaction receipt data, and transmitting the digital transaction receipt over the output interface to a digital receipts transaction processing system having a seller input interface for communicatively receiving the transmitted digital transaction receipt.

In yet another aspect, a method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising in a digital receipts transaction processing system having a seller input interface communicatively coupled to an output interface and receiving a transmitted digital transaction receipt, a buyer digital receipt output interface communicatively coupled to a buyer digital receipt memory store dedicated and unique to the buyer and identified by a buyer's digital receipt identifier, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of transmitting, in near real time in response to the receipt of the digital transaction receipt, a copy of the received digital transaction receipt to either the buyer's e-contact address or the seller digital transaction system and receiving, within a transaction window a buyer's purchase receipt, confirmation message from the buyer's e-contact address or the seller digital transaction system in response to the transmitted digital transaction receipt thereto. The method also includes that, in response to receiving the confirmation message performing the steps of transmitting a seller confirmation message to the seller digital transaction system and transmitting a first copy of the digital transaction receipt to the buyer digital receipt memory over the buyer digital receipt output interface. The method further includes the steps of transmitting a second copy of the digital transaction receipt to the seller digital receipt memory over the seller digital receipt output interface, and deleting from the digital receipts system memory the received digital transaction receipt.

In still another aspect, a method for providing purchase analytics from a plurality of transactional purchase made each made from two or more non-associated sellers using seller-specific different purchase processing systems and independent of any form of payment used by the buyer to pay the seller for the purchase, the method comprising in a first seller digital transaction system at a location of a first seller communicatively coupled to a first seller's purchase payment processing system and a first system output interface, the first seller digital transaction system processing a first buyer payment transaction associated with a first buyer, and a second seller digital transaction system at a location of a second seller communicatively coupled to a second seller's purchase payment processing system for processing a first buyer payment transaction and a second system output interface, the second seller digital transaction system for processing a second buyer payment transaction associated with a second buyer; and a digital receipts transaction processing system having a seller input interface communicatively coupled to an output interface and configured for receiving first and second digital transaction receipts, a digital receipts system memory each of the seller's digital receipts identifier. The method includes the steps in the digital receipts transaction processing system, performing the steps of storing a multi-layer taxonomy having a two or more layers having a plurality of predefined first level seller type identifiers and a plurality of second level predefined purchase item classification identifiers, and assigning a first level taxonomy classification seller type identifier to each of the first seller and the second seller by a type of seller, which are different and the two assigned taxonomy classification seller type identifiers being different. The method also includes transmitting to each of the assigned first level taxonomy classification seller type identifier to each associated first and second seller digital transaction processing systems, and transmitting to each first and second seller digital transaction processing system at least a portion of the second level predefined purchase item classification identifiers, the portions transmitted to the first and second seller digital transaction processing systems being different portions, but being compatible and consistent within the stored second level predefined purchase item classification identifiers of the digital receipts transaction processing system. The method also includes the steps in the first and second seller digital transaction systems, performing the steps of receiving and storing the transmitted assigned first level taxonomy classification seller type identifier and the portions of the second level predefined purchase item classification identifiers associated therewith and storing a seller's digital receipts identifier uniquely identifying the first seller from the second seller. The method also includes receiving first and second purchase transaction data from the first and second seller's purchase payment processing systems respectively, each which includes transaction receipt data including data related to the purchased item or items, a price, and payment amount of each of the first and second buyer payment transactions, but which does not include personalized data providing an identity of either the first buyer or the second buyer. The method includes the steps that for each first and second purchase transactions, identifying a second level predefined purchase item classification identifier for each purchased item in each of the first and second received receipt data; and assigning a transaction digital receipt number to each received first and second purchase transaction data that uniquely identifies each first and second seller and each first and second purchase transaction. The method also includes formatting a digital transaction receipt including the associated assigned transaction digital receipt number, the received seller's digital receipt identifier, the transaction receipt data, and the assigned second level predefined purchase item classification identifier for one or more of the purchased items within the transaction receipt data, and transmitting the digital transaction receipt over its output interface. The method also includes that in the digital receipts transaction processing system having a taxonomy analytics module providing non-buyer identifiable purchase taxonomy based analytics, and computer executable instructions for performing the steps of receiving first and second purchase transaction data from the first and second seller's purchase payment processing systems respectively, each which includes transaction receipt data including data related to the purchased item or items, a price, payment amount of each of the first and second buyer payment transactions, the assigned second level predefined purchase item classification identifier for one or more of the purchased items within the transaction receipt data but which does not include personalized data providing an identity of either the first buyer or the second buyer. The method also includes transmitting a copy of the digital transaction receipt with the added taxonomy purchase item identifiers to the associated seller digital receipt memory over the seller digital receipt output interface and deleting from the digital receipts system memory the received digital transaction receipt.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

Corresponding reference characters represent corresponding parts throughout the drawings.

DESCRIPTION OF THE DISCLOSURE

Figure 1:
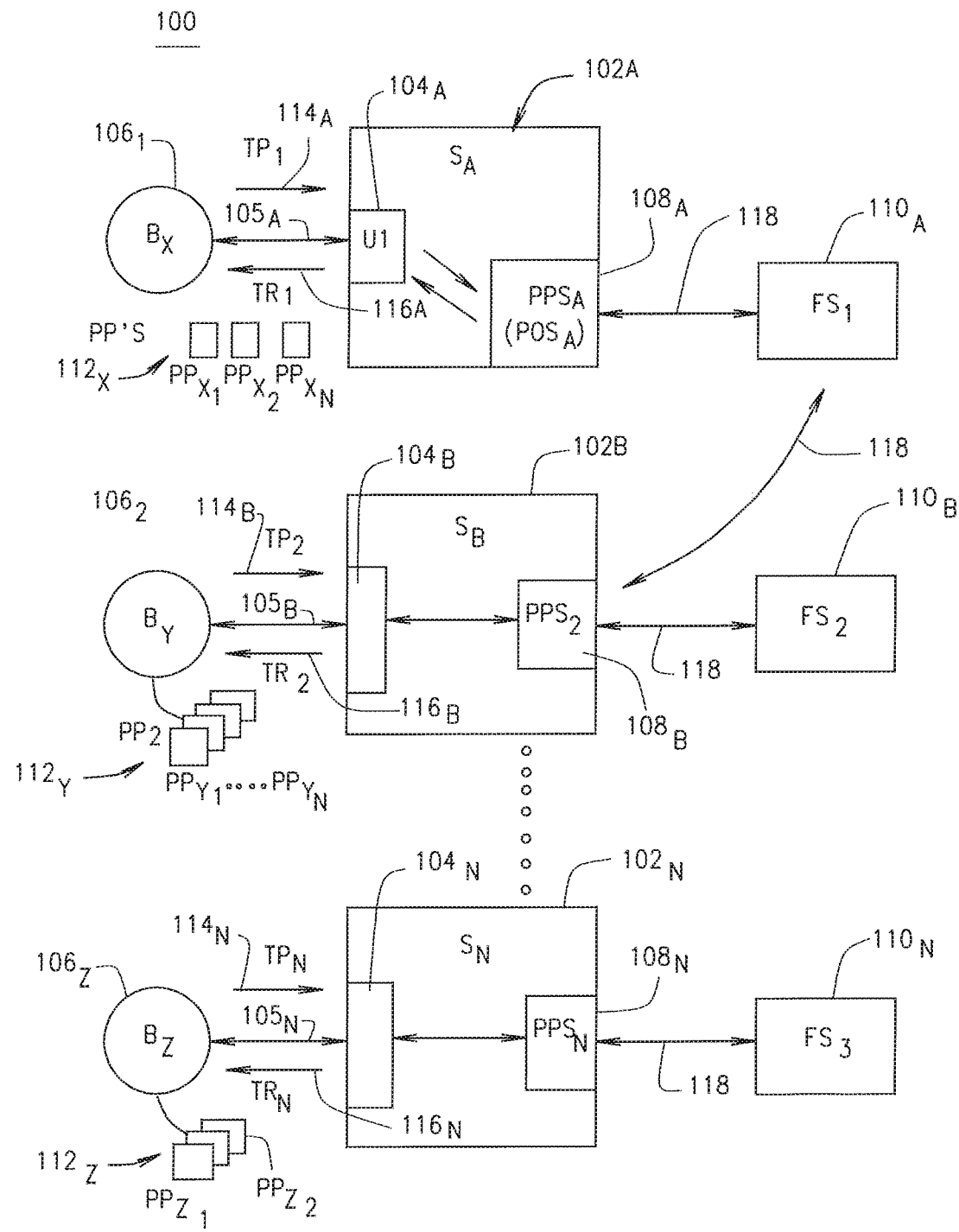
FIG. 1 is a block diagram illustrating a prior art purchase and payment method wherein three different sellers utilize three different seller-specific purchase processing systems each with a different paper or emailed receipt to the buyers of their purchased goods and services.

Acronyms and Other Terms Commonly Used Herein and in the Claims

For convenience, throughout this Description, the following acronyms are other commonly used terms shall have the following meanings:

a) "buyer" 106 shall include a buyer, purchaser, or customer of a product(s) or service(s);

b) "seller" 101 shall include an individual, retail store, or wholesaler of a product(s) or service(s) including both physical location, internet websites, etc.

c) "G-Receipt" or digital transaction receipt 116 shall mean a receipt for the purchase or goods or services generated in accordance with the system and method of the disclosure;

d) "POS" 108 shall mean any point of sale whether a physical location, internet website, or other;

e) "SDTS" 102 shall mean a seller's digital transaction system;

f) "TDRN" shall mean transaction digital receipt number;

g) "DTR" 220 shall mean digital transaction receipt;

h) "SDR" 220 shall mean seller's digital receipt and "BDR" shall mean buyer's digital receipt;

i) "DRTPS" 206 shall mean digital receipts transaction processing system;

j) "BRM" 234 shall mean buyer receipt message;

k) "STR" 220 shall mean seller's transaction receipt;

l) "SPPPS" shall mean seller's purchase payment processing system;

m) "TDRN" shall mean transaction digital receipt number;

n) "DTPS" 206 shall mean digital transaction processing system;

o) "GRTR" or digital transaction receipt 220 shall mean G-receipts digital receipts.

In accordance with the disclosure, a generated receipt (G-receipt) is a digitally classified, authenticated receipt stored in the cloud or other memory. No personal information of the buyer is stored with the receipt, nor is any billing data. All receipt data is stored on separate clouds or memories belonging to the buyer and to the seller. Creation of a G-receipt eliminates the need for generating a paper receipt unless a buyer specifically requests one.

Each G-receipt is bar coded or includes other indicia by which the receipt is uniquely identified and retrieved by the buyer, the seller, and third parties such as credit card issuers, product manufacturers, etc.

The present system and method provides new features and functions are not currently implemented or enabled by the disparate range of different seller systems and methods, all of which are unique to their system or to the payment system the digital receipts system DRS as described wherein provides new features and functionality to the to an integrated seller, a POS and purchase payment system, and to the buyer or consumer independent of any specified form of payment so that purchases are paid for in any manner convenient to a buyer.

1. In addition, a buyer is provided new features and services that heretofore have not been capable due to the many incompatible vendor dependent systems, that includes:

a) near "real time" access to all buyer's transaction receipts for all sellers, all purchase transactions and all forms of payment;

b) e-receipts that are delivered to the buyer in near real time by electronic delivery (e-delivery) including e-mail, text messaging, etc.;

c) buyer retrieval access to all stored receipts;

d) buyer purchase analytics including, for example, purchase/spending tracking and analysis by location (store or website) and by goods or services;

e) purchase data exportation to a new Application Program Interface (API) or an adaptable API including formatting to various financial, accounting, and tax preparation applications and systems; and f) access to loyalty award programs, information (if elected by the buyer) to upcoming sales by a manufacturer or service provider and associated coupons, and automatic notification to a manufacturer of the purchase of a warrantied item to initiate the warranty.

2. Newly enabled features provided to a buyer parent entity that is overseeing purchases of multiple child buyers can include:

a) "real time" or near real time receipt generation and notification to the buyer parent of receipt generation at the time of purchase or payment of a child buyer;

b) ability to confirm a processed receipt so that prior to the closing of a purchase, the buyer parent can confirm the amount of payment for the purchase;

c) receipt identification of any associated "tip" paid with the purchase by the child buyer;

d) the generated receipt (G-receipt) is an authenticated proof of purchase the same as a paper receipt issued at a POS and not merely a scanned image or PDF, whereby enabling a true copy of all child buyer receipts to the parent buyer;

d) tracking and purchase notification and identification of all child buyers of the parent buyer;

e) seller analytics for all child buyers and as a group cumulating all or a portion of child buyers for which the parent buyer is responsible;

f) verification and validation of purchases such as for use with child buyer (such as employee) expense receipts and receipt verification:

f) purchase data exportation to a new API or an adaptable API including formatting to various financial, accounting, and tax preparation applications and systems; and g) ability to allocate administer, and manage purchases, by type and category, for budgetary or other purposes.

3. Newly enabled features of the DTS system 200 that are provided for each seller include:

a) purchase tracking/spending; i.e., who is buying what, when, and where;

b) sales scoring; who, or what store sold what;

c) targeted advertising based on transaction buyer analytics;

d) inventory management and accounting; expense control and tracking;

e) POS push advertising to customers;

f) delivery of coupons, loyalty awards, warranty information;

g) after sales support including returns and exchanges;

h) push notification to customers for particular goods purchased such as for recalls.

4. Newly enabled features for purchased goods suppliers and manufacturers for which the seller's are providing to the buyers include:

a) customer purchase verification and tracking;

b) warranty and return tracking;

c) customer purchase statistics and analytics; and d) push coupons and awards.

5. Newly enabled features for third parties such as website operators, credit card issuers, and other advertisers include:

a) purchase statistics and analytics;

b) actual buyer purchase data rather than web-based "clicks";

c) advertising including new, predictive/prescriptive marketing/advertising; and d) push coupons and rewards.

By way of an overview, a G-receipts digital receipts system and the service it provides comprises a reliable system-based service platform that "sits above" all current methods of buyer payments and the diverse sellers' purchasing and POS systems. Now, buyers, retail and on-line sellers, and other third parties can benefit from G-receipt system capabilities that include digital receipts that cannot be lost or changed, reduced paper and ink usage, and cartilage changing. It also enables "real time" analytics of purchasing activities.

In one embodiment, a method of providing a payment and seller independent electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising, in a seller digital transaction system communicatively coupled to the seller's purchase payment processing system and an output interface, performing the steps of storing a seller's digital receipts identifier uniquely identifying the seller from among a plurality of non-related and non-associated sellers, receiving a buyer's digital receipt identifier that uniquely identifies the buyer within the digital receipts transaction processing system and receiving purchase transaction data from the seller's purchase payment processing system which includes transaction receipt data including data related to the purchased item or items, a price, and payment amount, but which does not include personalized data providing an identity of the buyer. The process also includes assigning a transaction digital receipt number to the received purchase transaction data that uniquely identifies the seller and the purchase transaction, formatting a digital transaction receipt including the assigned transaction digital receipt number, the received seller's digital receipt identifier, the buyer's digital receipt identifier, and the transaction receipt data, and transmitting the digital transaction receipt over the output interface.

The method also includes, in a digital receipts transaction processing system having a seller input interface communicatively coupled to an output interface and receiving a transmitted digital transaction receipt, a buyer digital receipt output interface communicatively coupled to a buyer digital receipt memory store dedicated and unique to the buyer and identified by a buyer's digital receipt identifier, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of transmitting, in near real time to receipt of the digital transaction receipt, a copy of the received digital transaction receipt to either the buyer's e-contact address or the seller digital transaction system and receiving, within a transaction window a buyer's purchase receipt, confirmation message from the buyer's e-contact address or the seller digital transaction system in response to the transmitted digital transaction receipt thereto. The method also includes storing the buyer's digital receipt identifier, and a buyer e-contact address, and the seller's digital receipts identifier. Further the method includes that in response to receiving the confirmation message performing the steps of transmitting a seller confirmation message to the seller digital transaction system and transmitting a first copy of the digital transaction receipt to the buyer digital receipt memory over the buyer digital receipt output interface. The method also includes transmitting a second copy of the digital transaction receipt to the seller digital receipt memory over the seller digital receipt output interface, and deleting from the digital receipts system memory the received digital transaction receipt.

In some embodiment, the digital receipts system performing the steps of storing a multi-layer taxonomy classification system having a plurality of predefined purchase item classification identifiers, and wherein the digital receipts transaction processing system, assigning a first level taxonomy classification purchase item identifier to the seller by a type of seller, transmitting to the assigned first level taxonomy seller type identifier to the seller digital transaction processing system, and transmitting to the seller digital transaction processing system at least a portion of the second level predefined purchase item classification identifiers, the portions transmitted to the seller digital transaction processing systems being unique to that seller, but being compatible and consistent within the stored second level predefined purchase item classification identifiers of the digital receipts transaction processing system. An including in the seller digital transaction system, the steps of receiving and storing the transmitted assigned first level taxonomy classification seller type identifier and the portion of the second level predefined purchase item classification identifiers associated therewith and identifying a second level predefined purchase item classification identifier for each purchased item in each of the received receipt data, wherein formatting the digital transaction receipt includes the assigned second level predefined purchase item classification identifier for one or more of the purchased items within the transaction receipt data.

In some embodiments, the buyer's e-contact address is associated with a mobile device of the buyer, the method includes providing a buyer software application for operating on the mobile device of the buyer, wherein the buyer software application hosting a graphical user interface and configuring the mobile device and the mobile device software application for the steps of receiving the transmitted copy of the received digital transaction receipt send by the digital receipt transaction processing system and visually presenting the received digital transaction receipt in the graphical user interface of the buyer mobile device graphical user interface. The steps including receiving an input from the buyer, in response to the visually presenting, indicating the buyer confirms the received digital transaction receipt and transmitting a buyer's purchase receipt confirmation message to the digital receipts transaction processing system. In some embodiments, the buyer software application further performing the steps of presenting to the buyer via the buyer mobile device graphical user interface access to a plurality of digital transaction receipts associated with the buyer, each of which is related to a different buyer purchase transaction and which digital transaction receipts from two or more non-associated sellers.

In some embodiments, the seller digital receipt memory includes an interface accessible by the seller, further performing the steps of retrieving and analyzing received digital transaction receipts stored in the seller digital receipt memory.

In some embodiments, the seller's digital transaction system includes a seller mobile device coupled to the seller's purchase payment processing system and includes an application program operating a buyer user interface receiving the buyer's digital receipt from at least one of an RFID chip, a bar code, a QR code, a scan code, a wireless transmission received from a buyers mobile device, or a buyer data entry.

In some embodiments, there are two or more non-associated sellers are communicatively coupled to the seller input interface of the digital receipts transaction processing system, two or more of the coupled non-associated sellers having seller's purchase payment processing systems that are not compatible with each other and wherein the digital transaction receipt from the first seller's purchase payment system has a first digital receipt format, and the digital transaction receipt from the second seller's purchase payment system has a second and different digital receipt format, and wherein the digital receipts transaction system includes, in the digital receipts system memory, formats for processing the two different digital receipt formats.

In some embodiments, the seller purchase payment processing system performing the steps of generating a seller transaction receipt (STR) specific to the seller and includes seller or seller purchase payment processing system defined purchase transaction data, the seller digital transaction system receiving and including the same seller purchase transaction data as the seller transaction receipt and wherein the received seller defined purchase transaction data includes at least one buyer receipt message selected from the group of messages consisting of a coupon, a service code, a rebate, a prize, a warranty, a text message, and an advertisement.

In another embodiment, a method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising in a seller digital transaction system communicatively coupled to the seller's purchase payment processing system and an output interface, performing the steps of storing a seller's digital receipts identifier uniquely identifying the seller from among a plurality of non-related and non-associated sellers, and receiving a buyer's digital receipt identifier that uniquely identifies the buyer within the digital receipts transaction processing system. The method also includes receiving purchase transaction data from the seller's purchase payment processing system which includes transaction receipt data including data related to the purchased item or items, a price, and payment amount, but which does not include personalized data providing an identity of the buyer and assigning a transaction digital receipt number to the received purchase transaction data that uniquely identifies the seller and the purchase transaction. The method also includes formatting a digital transaction receipt including the assigned transaction digital receipt number, the received seller's digital receipt identifier, the buyer's digital receipt identifier, and the transaction receipt data, and transmitting the digital transaction receipt over the output interface to a digital receipts transaction processing system having a seller input interface for communicatively receiving the transmitted digital transaction receipt.

In some embodiments, the seller's purchase payment processing system is a seller's point-of-sale (POS) system, and wherein the interface between the seller's POS system and the seller digital transaction system is an application programming interface (API).

In some embodiments, the seller's purchase payment processing system is an e-commerce payment system, and wherein the interface between the seller's e-commerce payment system and the seller digital transaction system is an application programming interface (API) and the e-commerce payment system hosting a graphical user interface (GUI) on a web or mobile application and wherein receiving the buyers digital receipt identifier includes at least one of receiving over the hosted GUI, prompting the buyer to enter or scan the buyer's digital receipt identifier and receiving an e-commerce operator manual input of the buyers digital receipt identifier.

In some embodiments, the seller purchase payment processing system generating a seller transaction receipt (STR) specific to the seller and which includes seller or seller purchase payment processing system defined purchase transaction data, the seller digital transaction system being formatted to receive the seller transaction data of the seller transaction receipt and additional seller transaction data, and formatting the additional seller transaction data within the digital transaction receipt.

In another embodiment, a method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising in a digital receipts transaction processing system having a seller input interface communicatively coupled to an output interface and receiving a transmitted digital transaction receipt, a buyer digital receipt output interface communicatively coupled to a buyer digital receipt memory store dedicated and unique to the buyer and identified by a buyer's digital receipt identifier, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of transmitting, in near real time in response to the receipt of the digital transaction receipt, a copy of the received digital transaction receipt to either the buyer's e-contact address or the seller digital transaction system and receiving, within a transaction window a buyer's purchase receipt, confirmation message from the buyer's e-contact address or the seller digital transaction system in response to the transmitted digital transaction receipt thereto.

The method also includes that, in response to receiving the confirmation message performing the steps of transmitting a seller confirmation message to the seller digital transaction system and transmitting a first copy of the digital transaction receipt to the buyer digital receipt memory over the buyer digital receipt output interface. The method further includes the steps of transmitting a second copy of the digital transaction receipt to the seller digital receipt memory over the seller digital receipt output interface, and deleting from the digital receipts system memory the received digital transaction receipt.

In some embodiment, in the digital receipts transaction processing system or the seller digital receipts memory, the step of providing a seller taxonomy analytics module and a seller analytics interface, each providing non-buyer identifiable purchase taxonomy based analytics over the seller specific analytics interface.

In some embodiment, in the buyer digital receipt memory, the steps of providing a buyer taxonomy analytics module and a buyer analytics interface providing buyer specific identifiable purchase taxonomy based analytics over the buyer seller specific analytics interface, and having a seller's digital receipt identifier that uniquely identifies the at least one seller within the digital receipts transaction processing system is subordinate to a supervisory or parent seller digital receipt identifier, and wherein the analytics interface of the at least one seller's digital receipts and taxonomy analytics is accessible by the parent seller digital receipt identifier.

In some embodiments, the digital receipts transaction processing system further performing a determining a buyer receipt message selected from the group of messages consisting of a coupon, a service code, a warranty, a rebate, a prize, a test message and an advertisement as a function of the at least a portion of the assigned taxonomy identifiers associated with the digital transaction receipt.

In some embodiments, in the digital receipts transaction processing system the process of transmitting the determined buyer receipt message to the seller digital transaction system or the seller's purchase payment processing system, or to include the determined buyer receipt message within the copies of the digital receipt transaction as transmitted to the buyer digital receipt memory and the seller digital receipt memory.

In some embodiments, at least one of the digital receipts transaction processing system and the buyer digital receipt memory includes a buyer specific analytics interface and a taxonomy analytics module providing buyer-specific identifiable purchase taxonomy based analytics over the buyer specific analytics interface.

In some embodiments, the buyer's e-contact address is associated with a mobile device of the buyer, the steps of providing a buyer software application for operating on the mobile device of the buyer, the buyer software performing the hosting a graphical user interface that includes the buyer specific analytics interface, and presenting, on the mobile device via the mobile device software application and its buyer mobile device graphical user interface access, a plurality of digital transaction receipts associated with the buyer, each of which is related to a different buyer purchase transaction and which digital transaction receipts from two or more non-associated sellers.

In some embodiments, the buyer digital receipt memory includes an analytics interface providing data access by the buyer for retrieving and analyzing received digital transaction receipts stored in the buyer's seller digital receipt memory.

In some embodiments, the buyer's digital receipt identifier uniquely identifies the buyer within the digital receipts transaction processing system is subordinate to a supervisory or parent digital receipt identifier, and wherein in the analytics interface providing the buyers digital receipts and taxonomy analytics also providing access to the buyer analytics by the parent digital receipt identifier.

In some embodiments, the digital receipts transaction processing system determining a buyer receipt message selected from the group of messages consisting of a coupon, a service code, a rebate, a prize, a text message and an advertisement as a function of the at least a portion of the digital receipt data of the digital transaction receipt.

In some embodiments, the digital receipts transaction processing system includes, in the digital receipts system memory, storing of a plurality of different and unique buyer's digital receipt identifiers, and storing buyer e-contact addresses, and establishing and managing a unique buyer digital receipt memory for each of the buyer's digital receipts identifiers, the digital receipts transaction processing system transmitting and storing the copy of the digital transaction receipts in each buyer digital receipts memory associated with the buyer's digital receipts identifier therefore.

In some embodiments, during the method thereof the seller digital transaction system fails to receive the buyers digital receipt identification, the seller digital transaction system performing all of the same recited processes and the formatting of the digital transaction receipt not including the buyers digital receipt identifier, and wherein the process within the digital receipts transaction system does not include the steps of transmitting to the buyers e-contact address or receiving a confirmation message, but rather transmitting a copy of the received digital transaction receipt only to the seller digital receipt memory and does not include transmitting a copy to the buyer digital receipt memory as an orphan digital transaction receipt.

In some embodiments, the digital receipts transaction processing system subsequently performing the steps of receiving a buyers digital receipt identification associated with the assigned transaction digital receipt number, and wherein, in the digital receipts transaction processing system, the steps of updating the copy of the digital transaction receipt stored within the seller digital receipt memory and transmitting a copy of the updated copy of the digital transaction receipt to the buyer digital receipt memory associated with the received buyers digital receipt identification.

In yet another embodiment, a method for providing purchase analytics from a plurality of transactional purchase made each made from two or more non-associated sellers using seller-specific different purchase processing systems and independent of any form of payment used by the buyer to pay the seller for the purchase, the method comprising in a first seller digital transaction system at a location of a first seller communicatively coupled to a first seller's purchase payment processing system and a first system output interface, the first seller digital transaction system processing a first buyer payment transaction associated with a first buyer, and a second seller digital transaction system at a location of a second seller communicatively coupled to a second seller's purchase payment processing system for processing a first buyer payment transaction and a second system output interface, the second seller digital transaction system for processing a second buyer payment transaction associated with a second buyer; and a digital receipts transaction processing system having a seller input interface communicatively coupled to an output interface and configured for receiving first and second digital transaction receipts, a digital receipts system memory each of the seller's digital receipts identifier.

The method includes the steps in the digital receipts transaction processing system, performing the steps of storing a multi-layer taxonomy having a two or more layers having a plurality of predefined first level seller type identifiers and a plurality of second level predefined purchase item classification identifiers, and assigning a first level taxonomy classification seller type identifier to each of the first seller and the second seller by a type of seller, which are different and the two assigned taxonomy classification seller type identifiers being different. The method also includes transmitting to each of the assigned first level taxonomy classification seller type identifier to each associated first and second seller digital transaction processing systems, and transmitting to each first and second seller digital transaction processing system at least a portion of the second level predefined purchase item classification identifiers, the portions transmitted to the first and second seller digital transaction processing systems being different portions, but being compatible and consistent within the stored second level predefined purchase item classification identifiers of the digital receipts transaction processing system. The method also includes the steps in the first and second seller digital transaction systems, performing the steps of receiving and storing the transmitted assigned first level taxonomy classification seller type identifier and the portions of the second level predefined purchase item classification identifiers associated therewith and storing a seller's digital receipts identifier uniquely identifying the first seller from the second seller. The method also includes receiving first and second purchase transaction data from the first and second seller's purchase payment processing systems respectively, each which includes transaction receipt data including data related to the purchased item or items, a price, and payment amount of each of the first and second buyer payment transactions, but which does not include personalized data providing an identity of either the first buyer or the second buyer. The method includes the steps that for each first and second purchase transactions, identifying a second level predefined purchase item classification identifier for each purchased item in each of the first and second received receipt data; and assigning a transaction digital receipt number to each received first and second purchase transaction data that uniquely identifies each first and second seller and each first and second purchase transaction.

The method also includes formatting a digital transaction receipt including the associated assigned transaction digital receipt number, the received seller's digital receipt identifier, the transaction receipt data, and the assigned second level predefined purchase item classification identifier for one or more of the purchased items within the transaction receipt data, and transmitting the digital transaction receipt over its output interface. The method also includes that in the digital receipts transaction processing system having a taxonomy analytics module providing non-buyer identifiable purchase taxonomy based analytics, and computer executable instructions for performing the steps of receiving first and second purchase transaction data from the first and second seller's purchase payment processing systems respectively, each which includes transaction receipt data including data related to the purchased item or items, a price, payment amount of each of the first and second buyer payment transactions, the assigned second level predefined purchase item classification identifier for one or more of the purchased items within the transaction receipt data but which does not include personalized data providing an identity of either the first buyer or the second buyer. The method also includes transmitting a copy of the digital transaction receipt with the added taxonomy purchase item identifiers to the associated seller digital receipt memory over the seller digital receipt output interface and deleting from the digital receipts system memory the received digital transaction receipt.

In some embodiment each seller digital receipt memory including a seller's analytics module and seller's analytics interface accessible by the seller providing for retrieving and analyzing received digital transaction receipts stored in the seller's digital receipt memory.

In some embodiment, at least one seller's digital receipt identifier that uniquely identifies the at least one seller within the digital receipts transaction processing system is subordinate to a supervisory or parent seller digital receipt identifier, and wherein the analytics interface of the at least one seller's digital receipts and taxonomy analytics is accessible by the parent seller digital receipt identifier, wherein at least one buyer's digital receipt identifier that uniquely identifies the at least one buyer within the digital receipts transaction processing system is subordinate to a supervisory or parent digital receipt identifier, and wherein the analytics interface of the at least one buyer's digital receipts and taxonomy analytics is accessible by the parent digital receipt identifier.

In some embodiment, in the first and second seller digital transaction systems, the steps can include receiving a buyer's digital receipt identifier that uniquely identifies the first buyer from the second buyer, wherein the formatting of the digital transaction receipt includes the buyer's digital receipt identifier, and in the digital receipts transaction processing system the steps of a buyer digital receipt output interface communicatively coupled to a buyer digital receipt memory store dedicated and unique to each of the first and second buyers and identified by each of the buyer's unique digital receipt identifier. This can include that in the digital receipts system memory storing each of the buyer's digital receipt identifier with the received digital receipt, the steps of identifying for each digital transaction receipt the buyer digital receipt memory store dedicated and unique to each of the first and second buyers and transmitting a copy of the digital transaction receipt with the added taxonomy purchase item identifiers to the associated buyer digital receipt memory over the buyer digital receipt output interface, wherein the deleting the associated digital transaction receipt from the digital receipt system memory is following the transmitting of both copies of the digital transaction receipt. The steps can also include providing buyer-specific identifiable purchase taxonomy based analytics to the associated buyers or to an authorized entity of the associated buyer.

In some embodiment, in the digital receipts transaction processing system determining a buyer receipt message selected from the group of messages consisting of a coupon, a service code, a warranty, a rebate, a prize, a text message and an advertisement as a function of the at least a portion of the assigned taxonomy identifiers associated with the digital transaction receipt, and the digital receipts transaction processing system transmitting the determined buyer receipt message to the associated seller digital transaction system or the associated seller's purchase payment processing system, or to include the determined buyer receipt message within the copies of the associated digital receipt transaction as transmitted to the associated buyer digital receipt memory and the associated seller digital receipt memory.

Figure 2:
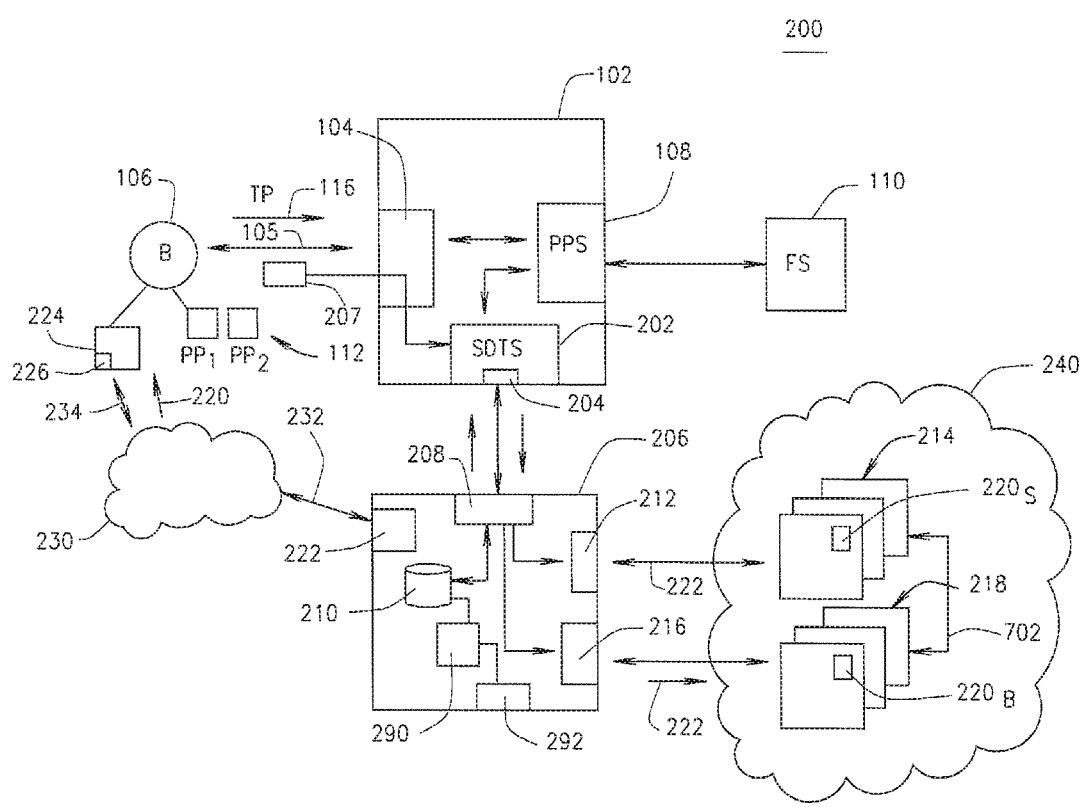
FIG. 2 is a block diagram of an exemplary embodiment of a new an novel system as described herein that provides an electronic digitized transaction receipt for a transactional purchase made with non-associated sellers independent seller-specific purchase processing systems that are independent of any form of payment used by the buyer to pay the seller for the purchase.

Referring now to FIG. 2 the G-receipts system 200 and method functions as a platform that fits on top of the numerous POS systems 108 as well as the diversity of payment methods. The system operates as a bearer service that includes interfaces for integrating with a diversity of POS systems 108 and is designed to assimilate and inter-operate within any online and physical retail process. Operation of the G-receipts system layer is to process classified G-receipts digital receipts or GRTRs and ensure their reliability and security, regardless of the diversity of POS devices and method of payments. GRTRs are not digital in the sense they come as part of an Email, or PDF file, or an image. The GRTRs offered by the G-receipts system are digital objects whose elements are digitally classified in ways that allow them to be located, produced, filtered, and analyzed. The digital nature of the G-receipts system and the resulting GRTRs enables buyers to completely get away from using paper receipts, Email receipts, and the like. The authentic nature of GRTRs, along with their positive impacts on sellers, buyers, and third parties goes beyond what a PDF, Email, or an image receipt can achieve.

There are costs and efforts involved to implement a G-receipts system, but the benefits of enabling buyers seller transactions receipts STRs and seller receipt actions that are converted into GRTRs will take place effortlessly and require relatively negligible pre-requisites and risks. As described hereinafter, the G-receipts system takes advantage of real-time predictive and prescriptive analytics to enable buyers to benefits from understanding their spending habits, and in turn project the post-sales pictures to marketing firms and other supply/demand researchers; while, insuring the highest degree of security and confidentiality to buyers. Further, the G-receipts system readily interfaces with third-party systems or service providers for integrated capabilities that to accommodate those who use their services.

The G-receipts system 206, as shown in FIG. 2, provides an electronic digitized transaction receipt or G-receipt for a transactional purchase made from two or more non-associated sellers 102 independent of any seller-specific purchase processing system SPPPS and independent of any form of payment used by a buyer 106 to pay the seller for the purchase of purchased products (PP's) 112. A seller's digital transaction system SDTS is communicatively coupled to the seller's purchase payment processing system and an output interface 204. The two or more non-associated sellers are each communicatively coupled to a seller input interface 208 of a DRTPS with each of the two or more coupled non-associated sellers having SPPPSs that are not compatible with each other. In this regard, a digital transaction receipt DTR from a first seller's purchase payment system has a first digital receipt format, and the DTR from the second seller's purchase payment system has a second and different digital receipt format. The DRTPS includes, in a system memory, formats for processing the two different digital receipt formats. This memory stores a buyer's digital receipt BDR identifier, a stored buyer e-contact address, and a seller's digital receipt SDR identifier.

As shown in FIG. 2, there is a single seller system 102 and a single buyer 106. Of course, one of ordinary skill will understand that the seller system 102 of the seller 101 will have many buyers 106 with each having a different purchase transaction 105 for which a transaction payment 114 will be made to one or more seller transaction user interfaces 104 of the seller system 102. As shown, this one buyer 106 is purchasing purchased goods 112 that are PP1 and PP2 but there can be a single good or service 112 or many more than just the two PP1 and PP2 as shown. The seller system 102 can, in some embodiments, continue to utilize their current or future purchase payment processing system 108 that can access, as may be required, a local or remote financial system 110. However, the present digital receipt system 200 includes the SDTS 202 that includes an interface 204 to the DRTPS 206 via its seller digital receipt input interface 208. The seller digital receipt SDR input interface 208 is configured to interface with a plurality of different non-associated seller system 102 each with a different SPPPSS 108 (such as a different POS). As shown in this embodiment, the SDTS can include a seller mobile device 207, which can be an existing device such as a scanner or screen, but in some embodiments, as described herein, can be a tablet or similar mobile computing device having software or a software application with a user interface for receiving buyer inputs such as a buyer's digital receipts BDR system identification that is unique to the buyer 106. The buyer 106 may also have a buyer mobile device 224 such as a mobile phone, by way of example, that includes a digital receipts mobile application 226.

The DRTPS 206 is typically a computer system or implementation that has an accessible system memory 210, of course a processor or processor function (not shown), and a plurality of interfaces as will be described. The digital receipts transaction processing system 206 includes various software and applications as described herein for enabling the systems and functions as described herein. The DTPS 206 has an a SDR output interface 212 communicatively coupled to a SDR memory 214 and a BDR output interface 216 communicatively coupled to a BDR memory 218. In some embodiments, the DTPS system also includes a taxonomy module 290 that is internal or separate as a separate system or application as described herein and that supports a taxonomy analytics interface 292. As shown, in some embodiments, the SDR memory 214 and/or the BDR memory 218 are implemented in a cloud 240 or they can be in any other suitable form of memory or storage. Each SDR memory 214 is separate and unique to each seller system 102 and each BDR memory 218 is separate and unique to each buyer 106.

The DTPS system 206 may also includes a buyer device interface 222 that can, in some embodiments, be communicatively coupled via a network 230, which could be any suitable communication network such as the internet or mobile carrier or wireless carrier network or any combination thereof, by way of example, to the buyer mobile or computing device 224 such as through the buyer digital receipts application 226.

In operation, the DRS system 200 as shown in FIG. 2 provides completely new functionality for completing the purchase transaction 105 as described in more detailed throughout this disclosure. In simple operation as shown in FIG. 2, during the purchase transaction 105, the seller system 102 at the seller user interface 104 receives from the buyer 106 a digital receipt buyer identifier, identification number or ID. As shown in FIG. 2, this is obtained, in this exemplary embodiment, via a seller mobile device 207, which could be a tablet or could be a scanner or card reader or the like. The seller user interface 104 provides the received buyer digital receipts identifier to the seller digital transactions system 202. The seller user interface 104 and/or the SDTS 202 has a stored seller's digital receipts identifier uniquely identifying the seller 101 from among a plurality of non-related and non-associated sellers 101 (not shown). The SDTS 202 receives the buyer's digital receipt identifier that uniquely identifies the buyer within the digital receipts transaction processing system, and receives the purchase transaction data from the seller's purchase payment processing system 108, which includes transaction receipt data for the transaction 105 that includes transaction data related to the purchased products 112 such as the item name or description, a price, and a payment amount. However, the SDTS 202 does not, in some embodiments, include personalized data providing an identity of the buyer 106 as such is not transmitted with the digital transaction receipt, but may reside for other purposes. The SDTS 202 assigns a transaction digital receipt number to the received purchase transaction data that uniquely identifies the seller system 102 (and therefore the seller 101) and the purchase transaction 105. The SDTS 202 formats a digital transaction receipt DTR 220 that includes the assigned transaction digital receipt number, the received seller's digital receipt identifier, the buyer's digital receipt identifier, and the transaction receipt data and then transmit the formatted digital transaction receipt over the output interface 204.

The DTPS 206 receives over the seller input interface 208 the transmitted digital transaction receipt DTR 220 and stores in the digital receipts system memory 210 digital transaction receipt DTR 220. The DTPS 206 transmits, in real time or near real time, the received digital transaction receipt DTR 220 as indicated by request-reply message 232 to either a stored buyer's e-contact address or to the seller digital transaction system for receiving a buyer confirmation 221 as to the contents of the digital transaction receipt DTR 220. Typically, with a transaction window related to the purchase transaction 105 in a reasonable and timely manner with the buyer 106 at the seller user interface 104, the buyer will provide or input a buyers confirmation 221 of the digital transaction receipt DTR 220 and a buyer's purchase receipt confirmation message 234 is generated either from the buyers device 224 with the application 226 or from the SDTS 202 where the DTR 220 is presented to the buyer 106 via the seller mobile device 207. In response to receiving the confirmation message 234, the DTPS 206 transmits a seller confirmation message to the SDTS 202, transmits a first copy of the DTR 220B to the BDR memory 218 over the BDR output interface 216, and transmits a second seller DTR copy 220S of the digital transaction receipt DTR 220 to the SDR memory 214 over the SDR output interface 212. Thereafter, the DTPS can, in some embodiments, delete from the digital receipts system memory 210 the DTR 220 associated with the purchase transaction 105. The seller DTR copy 220S of the purchase transaction 105 with all of the transaction data is stored in the SDR memory of the seller system 102. The buyer copy 220B of the purchase transaction 105 with all of the transaction data is stored in the BDR memory of the byer 106, with each being identical to each other in some embodiments. As shown in FIG. 2 and in more detail in FIG. 7, the seller and buyer copies of the same digital receipt 220 can be compared and authenticated in process 702.

Figure 3:
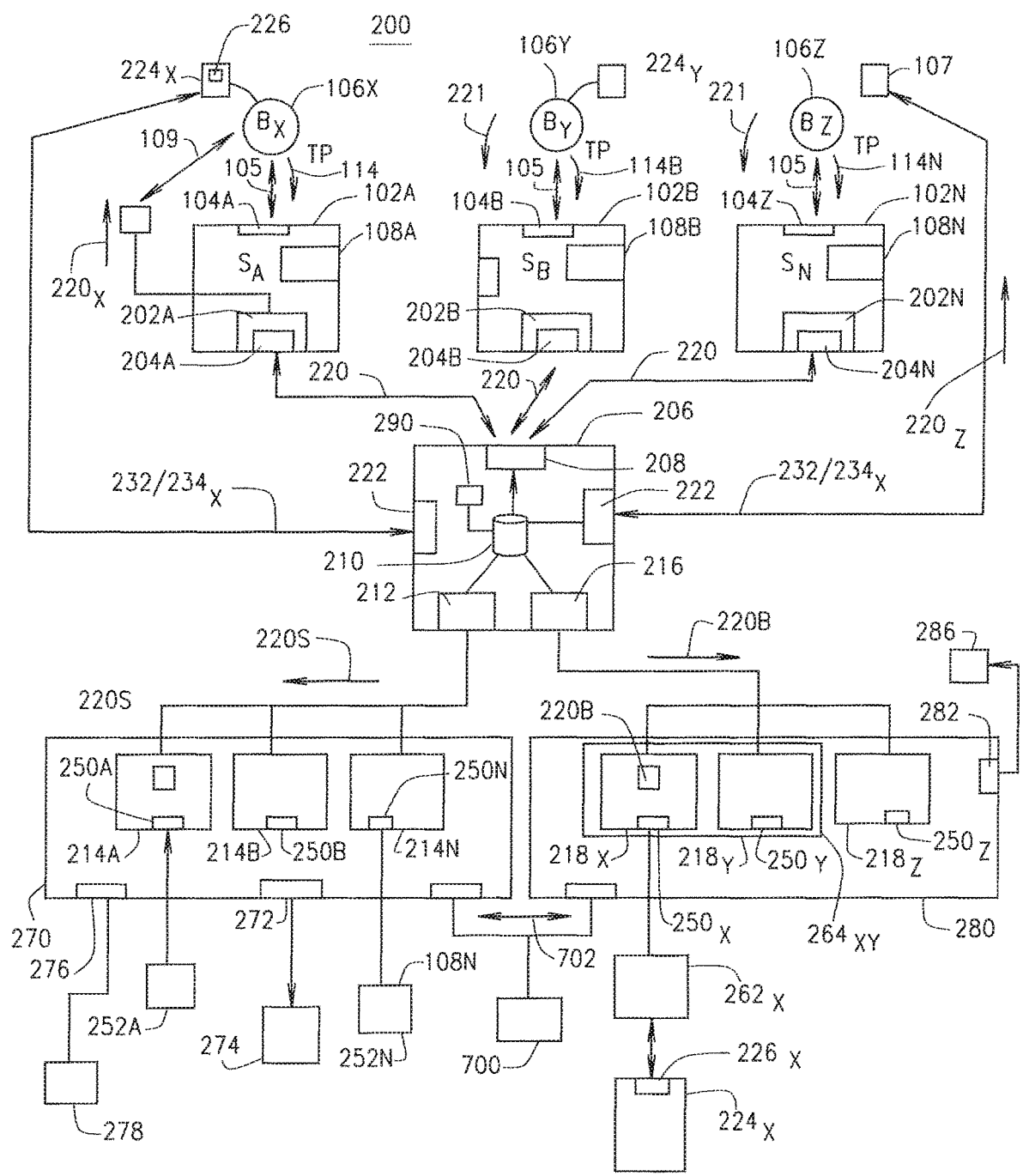
FIG. 3 is a block diagram of an exemplary embodiment of a new and novel system as described herein that provides an electronic digitized transaction receipt for a transactional purchase made from two or more non-associated sellers independent of any seller-specific purchase processing systems and independent of any form of payment used by the buyer to pay the seller for the purchase.

Referring now to FIG. 3, a more complex exemplary embodiment of system 200 is shown that provides an expanded and more detailed view of the versatility and benefits of the DRS system 200 as described herein with multiple sellers 102A, 102B and 102N each having a different and most often non-compatible purchase processing system 108A, 108B, and 108N. Each also has a different buyer 106X, 106Y, and 106Z each buyer different purchased goods or services 112 as described with regard to FIG. 2.

The SDTS is configured for a) storing a SDR identifier which uniquely identifies the seller from among a plurality of non-related and non-associated sellers; b) receives a BDR identifier that uniquely identifies the buyer within the DRTPS, c) receives purchase transaction data from a SPPPS, this data including transaction receipt data related to a purchased item or items 112, a price, and, d) the amount of the payment for the purchase. Importantly, the information stored in the SDTS does not include any personalized data that would identify the buyer. In addition to the above, the SDTS e) assigns a transaction digital receipt number TDRN to the received purchase transaction data so to uniquely identify the seller and the purchase transaction, f) formats a digital transaction receipt DTR including the assigned TDRN, the received SDR identifier, the BDR identifier, and the transaction receipt data; and, g) transmits the DTR over the output interface.

The DRTPS includes a seller input interface 104 which is communicatively coupled to an output interface and receives a transmitted DTR. A BDR output interface is communicatively coupled to, and stored in, a BDR memory that is dedicated and unique to the buyer and is identified by a BDR identifier. A SDR output interface is communicatively coupled to a SDR memory dedicated and unique to the seller and identified by a SDR identifier. A digital receipts system DRS has a memory which a) stores the BDR identifier, b) stores a buyer e-contact address, and c) stores the SDRs identifier. The DRS includes a memory which stores a multi-layer taxonomy having a plurality of predefined purchase item classification identifiers.

The DRTPS, in a digital receipts system memory, stores a plurality of different and unique BDR identifiers including a stored buyer e-contact address, and establishes and manages a unique BDR memory for each of the BDR identifiers. The DRTPS also transmits and stores the copy of the DTRs in each BDR memory associated with the BDR identifier for it.

The DRS further includes computer executable instructions for performing the steps of a) transmitting, in near real time to receipt of the DTR, a copy of the received DTR to either the buyer's e-contact address or the SDTS; b) receives, within a transaction window, a buyer's purchase receipt confirmation message from the buyer's e-contact address or the SDTS, in response to a DTR transmitted to it; and c) in response to receiving the confirmation message performs the steps of: i) transmits a seller confirmation message to the SDTS, ii) transmits a first copy of the DTR to the BDR memory over a BDR output interface, and iii) transmits a second copy of the DTR to a SDR memory over the SDR output interface 104, and iv) deletes from the digital receipts system memory the received DTR.

In a transaction, the DRTPS assigns a first level taxonomy classification purchase item identifier to the seller by type of seller. It also identifies a second and higher level taxonomy classification identifier for each purchased item 112 in the received receipt data from among a number items available for purchase, and adds the assigned and identified taxonomy classification purchase item identifiers to a copy of the DTR prior to transmitting copies of the DTR to the BDR memory and the SDR memory. In addition, the DRTPS includes a taxonomy analytics module for providing a non-buyer identifiable purchase taxonomy based analytics over a seller specific analytics interface. Further, the DRTPS includes a taxonomy analytics module that provides buyer-specific identifiable purchase taxonomy based analytics over the buyer's specific analytics interface. The DRTPS is also configured to determine a buyer receipt message BRM selected from the group of messages consisting of one or more of the following: a coupon, a service code, a warranty, a rebate, a prize, a text message, or an advertisement. These result as a function of at least a portion of the assigned taxonomy identifiers associated with the DTR.

Regarding taxonomy, the DRTPS memory stores a multi-layer taxonomy having two or more layers. These each have a plurality of predefined first level seller type identifiers and a plurality of second level predefined purchase item classification identifiers. A DRTPS assigns a first level taxonomy seller type identifier to each seller by the type of seller and this information is transmitted to the respective sellers' digital transaction processing system DTPS. Also transmitted to each seller's DPTS is at least a portion of the second level predefined purchase item classification identifiers. The portion transmitted to a seller's DPTS is unique to that seller, but is compatible and consistent within the stored second level predefined purchase item classification identifiers of the DRTPS.

The seller's DPTS receives and stores the transmitted assigned first level taxonomy classification seller type identifier and the portion of the second level predefined purchase item classification identifiers associated with it. The DPTS then identifies a second level predefined purchase item classification identifier for each purchased item in each received receipt data. Formatting a DTR includes the assigned second level predefined purchase item classification identifier for the one or more purchased items within the transaction receipt data.

The DRTPS or the appropriate SDR memory includes a seller taxonomy analytics module and a seller analytics interface so to provide non-buyer identifiable purchase taxonomy based analytics over a seller specific analytics interface. In addition, a seller's analytics module is configured to receive a third level of taxonomy as defined by an associated seller. The SDR identifier uniquely identifies the at least one seller within the DRTPS that is subordinate to a supervisory or parent seller digital receipt identifier. This analytics interface and the taxonomy analytics are accessible by the parent's SDR identifier.

Regarding buyers, a BDR memory includes a buyer taxonomy analytics module and a buyer analytics interface for providing buyer specific identifiable purchase taxonomy based analytics over a buyer specific analytics interface.

The DRTPS will transmit BRMs to the SDTS or the seller's purchase payment processing system. The DRTPS also includes determined BRMs within copies of a DRT transaction as transmitted to the BDR memory and the SDR memory. The BDR memory includes an analytics interface accessible by the buyer for retrieving and analyzing received DTRs stored in the BDR memory. A BDR identifier uniquely identifies the buyer within the DRTPS. This identifier is subordinate to a supervisory (or parent) digital receipt identifier. The analytics interface to the BDR and taxonomy analytics is accessible by the parent digital receipt identifier.

Figure 13:
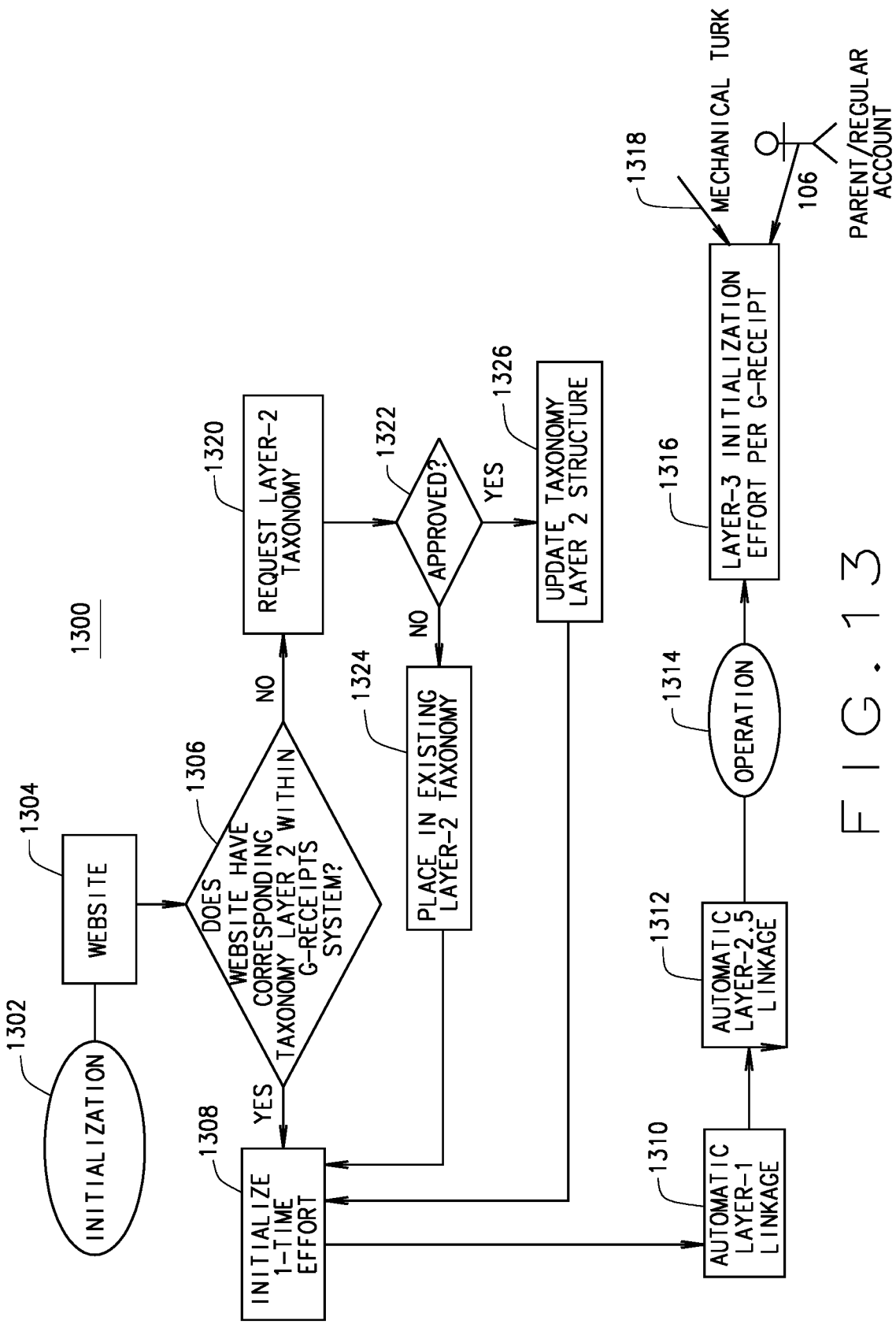
FIG. 13 is a flow chart of a layered taxonomy process for adding in a new layer 2 taxonomy for a G-receipt illustrating one exemplary embodiment thereof.

Referring to FIG. 13 is one exemplary embodiment of a layered taxonomy process 1300 for adding a new layer 2 taxonomy for categorizing a digital receipts DTR 220 in a DRS 200 or DRTPS 206. As shown, the process 1300 is initialized at 1302 typically through a website hosted by the DRS 200 or the DRTPS 206. The process continues by a determination at process 1306 as to whether the corresponding taxonomy layer 2 is within the digital receipts system. If such taxonomy layer 2 already exists with a DRS 200 or DRTPS 206, the process goes to initialize in process 1308 time effort and the process automatically provide layer 1 linkage in process 1310 and then automatically links to layer 2.5 in process 1312. The process continues with the operation in process 1314 and a layer 3 initialization effort is made in G-Receipt in process step 1316 that can be access by a mechanical turk 1318 or a buyer 106. If in process 1306 the taxonomy layer 2 does not currently exist within the digital receipts system, the method continues to process 1320 wherein the system requests a new layer 2 taxonomy. If the system approves the requested new layer 2 taxonomy in process 1322, the system updates the taxonomy layer 2 structure in process 1326 and the method moves to process 1308 and continues as described above. If process 1322 does not approve the requested new layer 2 taxonomy, the requested layer 2 taxonomy is placed into an existing layer 2 taxonomy and the process continues to process 1308 and further processing as described above.

Figure 4:
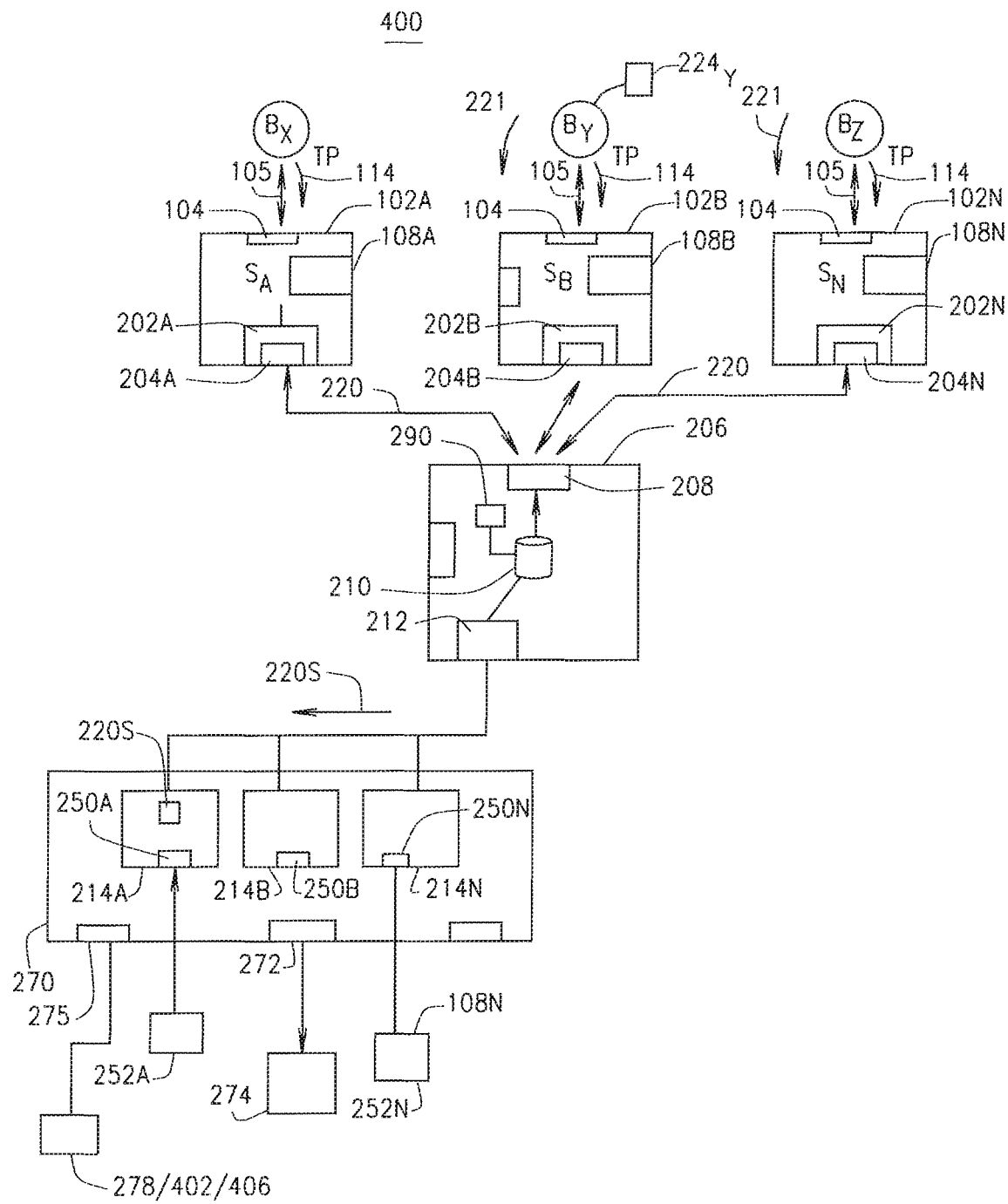
FIG. 4 is a block diagram a system providing purchase analytics from a plurality of transactional purchases made each made from two or more non-associated sellers using seller-specific different purchase processing systems and independent of any form of payment used by the buyer to pay the seller for the purchase, according to one exemplary embodiment.

With respect to the foregoing discussion, and as shown with respect to FIG. 4, in some embodiments, system 200 is be implemented only as a seller-only digital receipts analytics system 400 either as a standalone system or functionally within the architecture as described above with regard to FIG. 3. The system 400 shown in FIG. 4 is not required to have a BDR identifier associated with each DTR 220. As noted, this can be administered as a subsystem of system 206 through computer coding and logic, or as a separate software applications within the DRS 200 for the SDTS 202 and the DTPS 206. As shown, the systems and functions for each of the sellers 102A, 102B and 102N are as shown in FIG. 3; but now, each DTR 220 does not include the BDR identifier or require a confirmation 221 from the buyers 106. Each SDTS 204A, 204B, 204N transmits the DTR 220, which is transmitted as a seller DTR 220S to the associated SDR memory 214A, 214B, 214N, respectively. In the embodiment of FIG. 4, the DRS 400 is used primarily by the sellers 102 for their own inventory and purchase management including seller group analytics such as for sellers within a franchise group or the like. In such an embodiment, the seller purchase processing system 108 can access the seller digital receipts DTR 220S such as through analytics system 252N. Further a corporate access system 402 can access the seller digital receipts DTR 220S associated within their parent group for expense tracking, inventory verification, tax and financial management, by way of examples. Similarly, the DRS system 400 can provide a third party interface 275 that allows third parties, such as marketing and advertising company systems 406, to obtain actual and real SDR analytics data based on taxonomy of the DRS 200 system. Financial and tax systems 278 can also obtain access in some embodiments.

In the G-receipts system, a buyer's e-contact address is associated with a buyer's mobile device; e.g., a tablet, which has a software application embedded in it configured for operating on the mobile device of the buyer and hosting a graphical user interface GUI. The mobile device and its embedded software a) receives a transmitted copy of the received DTR sent by the DRTPS; b) visually presents the received DTR on the GUI; c) receives an input from the buyer, in response to the visual representation, confirming buyer receipt of the DTR; and, d) transmits a confirmation message to the DRTPS. The GUI also includes a buyer specific analytics interface. The mobile device and its associated software present to the buyer, via the GUI, access to a plurality of DTRs associated with that buyer, each of which is related to a different purchase transaction of the buyer and DTRs from two or more non-associated sellers.

The SDTS also includes a seller mobile device; e.g., again a tablet, that is coupled to the seller's purchase payment processing system. This includes an application program operating a buyer's user interface and it is configured for receiving a BDR from at least one of an RFID chip, a bar code, a QR code, a scan code, a wireless transmission received from a buyer's mobile device, or a buyer data entry.

The SDR memory, which is a component of the DRTPS, includes an interface accessible by the seller for retrieving and analyzing received DTRs stored in that memory. The SDR memory and the BDR memory, which is also a component of the DRTPS, are both cloud implemented memory system components of the DRTPS.

Next, there is included within a SPPPS, an interface between the seller's POS system and the SDTS. The SDTS, in turn, includes a digital receipts application program running on the SPPPS.

The SPPPS is an e-commerce payment system in which an interface between the seller's e-commerce payment system and the SDTS is an application programming interface or API. This e-commerce payment system includes a hosted GUI implemented on a web or mobile application. A BDR identifier is received over the GUI which includes an on-line prompt message or icon to the buyer for entering or scanning the BDR identifier. Receiving the BDR identifier also includes receiving an e-commerce operator's manual input of the BDR identifier.

The SPPPS generates a STR specific to the seller and includes seller, or SPPPS defined purchase transaction data. The SDTS is configured to receive, and include, the same seller's purchase transaction data as is on the STR. Also, the received seller defined purchase transaction data includes a BRM selected from the group of messages consisting of a coupon, a service code, a rebate, a prize, a text message, a warranty, and an advertisement. Further, the SPPPS is formatted to receive not only the seller transaction data on the STR but also additional seller transaction data, and to format such additional seller transaction data within the DTR.

The SDTS provides a message to the SPPPS to complete the purchase transaction only upon receipt of a buyer's purchase confirmation message. In response to the transmission of a copy of a DTR to either the buyer's e-contact address or the SDTS, there is received within a buyer's purchase receipt confirmation message the amount of a gratuity (as, for example, when the purchase is for a meal at a restaurant) as entered or designated by the buyer in response to receipt of a copy of the DTR. The amount of the gratuity is included in a subsequently transmitted DTR.

The SPPPS, the SDTS, and the DTR are independent of the form of payment used by the buyer to pay the seller for the purchase. In this regard, the SPPPS, SDTS, and DTR are configured to support forms of payment including cash, PayPal, credit card, debit card, loyalty card, e-wallets, bitcoin, NFC or Bluetooth or other wireless payment platforms and applications.

If the SDTS fails to receive a BDR digital receipt identification, the SDTS performs all of the same processes for formatting a DTR, again not including the BDR identifier. Also, not included within the digital receipts transaction system processing is the step of transmitting to the buyers e-contact address or receiving a confirmation message; but rather transmitting a copy of the received DTR only to the SDR memory and not transmitting the copy to the BDR memory as an orphan DTR. If the digital receipts transaction processing system subsequently receives a BDR identification associated with the assigned transaction digital receipt number, the digital receipts transaction processing system updates the copy of the DTR stored within the SDR memory. An updated copy of the DTR is then transmitted and stored in the BDR memory associated with the received BDR identification.

For implementation of the G-receipts system, a special hardware unit; e.g., a tablet with a G-receipts system application or "app", is installed at sellers selling sell goods and services to buyers. The unit communicates with the POS system through an API and web services. Once communication is established, buyers use the app on their tablet; a barcode, or RFID identity to scan their account credentials so their receipt is transferred into an account associated with the buyer's validated email. The hardware unit is installed at the seller is programmed to transmit the appropriate information about the seller; e.g., the seller's location, as well as information regarding the buyer who scanned their identity. This enables each receipt to be stored into a respective account holder's GRM account as well as inside the GRM seller's GRMS's account. These GRM accounts for the buyers (GRMB) and sellers (GRMS) can be one of a plurality of configurations; but in some embodiments, these GRM accounts are cloud based with all pertinent information encrypted so as to ensure data confidentiality and integrity within the cloud. Those skilled in the art will appreciate that other forms and methods of memory management and implementation of the G-receipts system, its applications and stored data are possible.

Online payments are done in a similar fashion; although, the hardware unit that is otherwise used with a retail seller's POS system, is now a program that links to an embedded script at the seller's E-commerce website. Buyers enter their QR code, RFID identity, or other identification indicia such as alphanumeric and/or symbols into one or more identification fields (e.g., User name and Password) recognized by the website. Or, the buyer logs into a G-receipts account using the E-commerce site's JavaScript that allows buyers to log into their account.

After purchases are made, receipts are sent, in accordance with the above described method, into the buyer's respective account. Buyers then review a receipt using drop down filters such as Amount, Seller, Location, Date from-Date to, Taxonomy classification of the purchase (i.e. clothing, food, travel, furniture, etc.). This can be done because the retail sellers' hardware unit or the online sellers' software includes key initialized meta-data about the seller. This includes information such as name, location, type of goods, etc.). This meta-data, together with information such as date of purchase date, time, purchase amount, applicable sales tax, any discounts, coupons, etc.) are combined to facilitate the buyer's searching.

As shown, seller system 102A has PPS 108A with SDTS 202A with interface 204A, seller system 102B has PPS 108A with SDTS 202B with interface 204B, and seller system 102N has PPS 108N with SDTS 202N with interface 204N, all of which are communicatively coupled to the seller interface 208 of the DTPS 206. Seller system 102A has a SDR memory 214A, Seller system 102B has a SDR memory 214B, and Seller system 102N has a SDR memory 214N, each communicatively coupled to seller digital receipt output interface 212 of DTPS 206.

Buyer 106X is making a purchase transaction 105A at seller system 102A using seller interface 104A and making a transaction payment 114A. Buyer 106X has a BDR memory 218X that is accessed by the DTPS 206 via the BDR output interface 216. Similarly, Buyer 106Y is making a purchase transaction 105B at seller system 102B using seller interface 104B and making a transaction payment 114B. Buyer 106Y has a BDR memory 218Y that is accessed by the DTPS 206 via the BDR output interface 216 and Buyer 106Z is making a purchase transaction 105N at seller system 102N using seller interface 104N and making a transaction payment 114N. Buyer 106Z has a BDR memory 218Z that is accessed by the DTPS 206 via the BDR receipt output interface 216.

During processing of transaction 105A, the DTR 220 is generated as 220X and request-reply messages 232 with DTR 220X is sent to the buyer mobile device 224x with digital mobile app 226 active thereon. The buyer 106X can confirm the contents of the DTR 220X and the confirmation message 234X is sent back to the DTPS 206. A confirmation message is sent to the SDTS 202A to complete the purchase transaction 105A and the DTPS 206 sends a buyer copy DTR 220B to the BDR memory 218X of the buyer 106X. The DTPS 206 also sends a seller copy DTR 220X to the SDR memory 214A of the seller system 102A.

During processing of transaction 105B, the buyer 106Y does not have the mobile digital receipts application 226 but rather has a BDR identifier such as a card or RFID chip. The DTR 220 is generated as DTR 220Y and request-reply messages 232 with DTR 220Y is sent back to the SDTS 202Y. The SDTS 202Y either directly or via PPS 108B prompts the seller system 102B to obtain the buyer's digital receipts identifier such as by scanning the buyers digital receipts card and obtains the buyers confirmation in the same manner. The buyer 106Y can confirm the contents of the DTR 220X as presented to the buyer 106Y by the seller system 102B and a confirmation message 234Y is sent back to the DTPS 206. A confirmation message is sent to the SDTS 202B to complete the purchase transaction 105B and the DTPS 206 sends a buyer copy DTR 220B to the BDR memory 218Y of the buyer 106Y. The DTPS 206 also sends a seller copy DTR 220Y to the SDR memory 214B of the seller system 102B.

During processing of transaction 105N, the seller has a seller mobile device 207 for obtaining the BDR identifier. The DTR 220 is generated as DTR 220Z and request-reply messages 232 with DTR 220Z is sent back to the SDTS 202Z so that the SDTS 202Z can provide the seller mobile device 207 with a prompt to obtain the BDR identifier as an input or by scanning a card or RFID chip or NFC device, by ways of examples. The SDTS 202Z via the seller mobile device 207 prompts the seller system 102N to obtain the BDR identifier such as by scanning the BDR card and obtains the buyers confirmation in the same manner. The buyer 106Z can confirm the contents of the DTR 220Z as presented to the buyer 106Z by the seller system 102N and a confirmation message 234Z is sent back to the DTPS 206. A confirmation message is sent to the SDTS 202N to complete the purchase transaction 105N and the DTPS 206 sends a buyer copy DTR 220B to the BDR memory 218Z of the buyer 106Z. The DTPS 206 also sends a seller copy DTR 220Z to the seller digital receipt memory 214N of the seller system 102N.

FIG. 3 also illustrates various interfaces and functionalities of both the SDR memories 214 (214A, 214B, 214C) and the BDR memories 218 (218X, 218Y, 218Z). As shown in this exemplary embodiment, SDR memories 214A, 214B, 214C are implemented in a combined memory system such as seller memory cloud application 270 and the BDR memories 218X, 218Y, 218Z are implemented in a combined memory system such as a buyer memory cloud application 280. The two can be coupled, synchronized and the copies of the DTRs 220S and 220B can be verified and authenticated to ensure that they match via process 702 of DTR verification system process 700.

With regard to SDR memories 214A, 214B, 214C and where implemented the combined seller memory system 270, a sellers analytics interface 250A can provide for seller analytics system 252A to obtain access and analysis and analytics therefrom. Further, seller analytics system 252A can be used to add additional layer taxonomy data on a seller specific basis to add further value to this interface and system capability. In some embodiments, the combined memory system 270 can provide a seller analytics interface 272 that can provide a seller having more than one SDR memory 214 associated with it or be responsible for a parent account via a combined seller analytics interface 274. This can also be implemented with a third party analytics interface 275 that provides third party seller analytics system 276 to search and obtain seller digital receipts analytics that are non-buyer identifiable.

With regard to the BDR memories 218X, 218Y, 218Z and the combined buyer memory system 280, buyer digital receipts DTR 220B can only be accessed by each associated buyer 106X, 106Y, and 106Z, respectively via buyer analytics interface 250X, 250Y, and 250Z, also respectively. As shown, a buyer analytics access system 262X can only access BDR memory 218X and obtain analytics for the DTR 220B that are stored therein. The buyer analytics access system 262X can also be used to input into the BDR memory 218X an additional layer of taxonomy that is specific to buyer 106X to add value to the analytics. As shown, the buyer 106X can also access the buyer analytics interface 250X or the buyer analytics access system 262X by using their mobile device 224X via the BDR application 226X as will be described in FIG. 9 by way of one exemplary embodiment. Further as shown in FIG. 3, the BDR memory system 280 can include a parent interface 282 that has access to more than one associated and preapproved BDR memories. In this example, a parent buyer analytics access system 286 can access the DTRs 220 and analytics for more than one child BDR 218. This is used in a family situation or in a corporate situation. This can also include inputting common additional taxonomy across multiple BDR memories 218 such as for accounting or taxation or financial management using the buyer parent analytics access system 286.

Figure 5A:
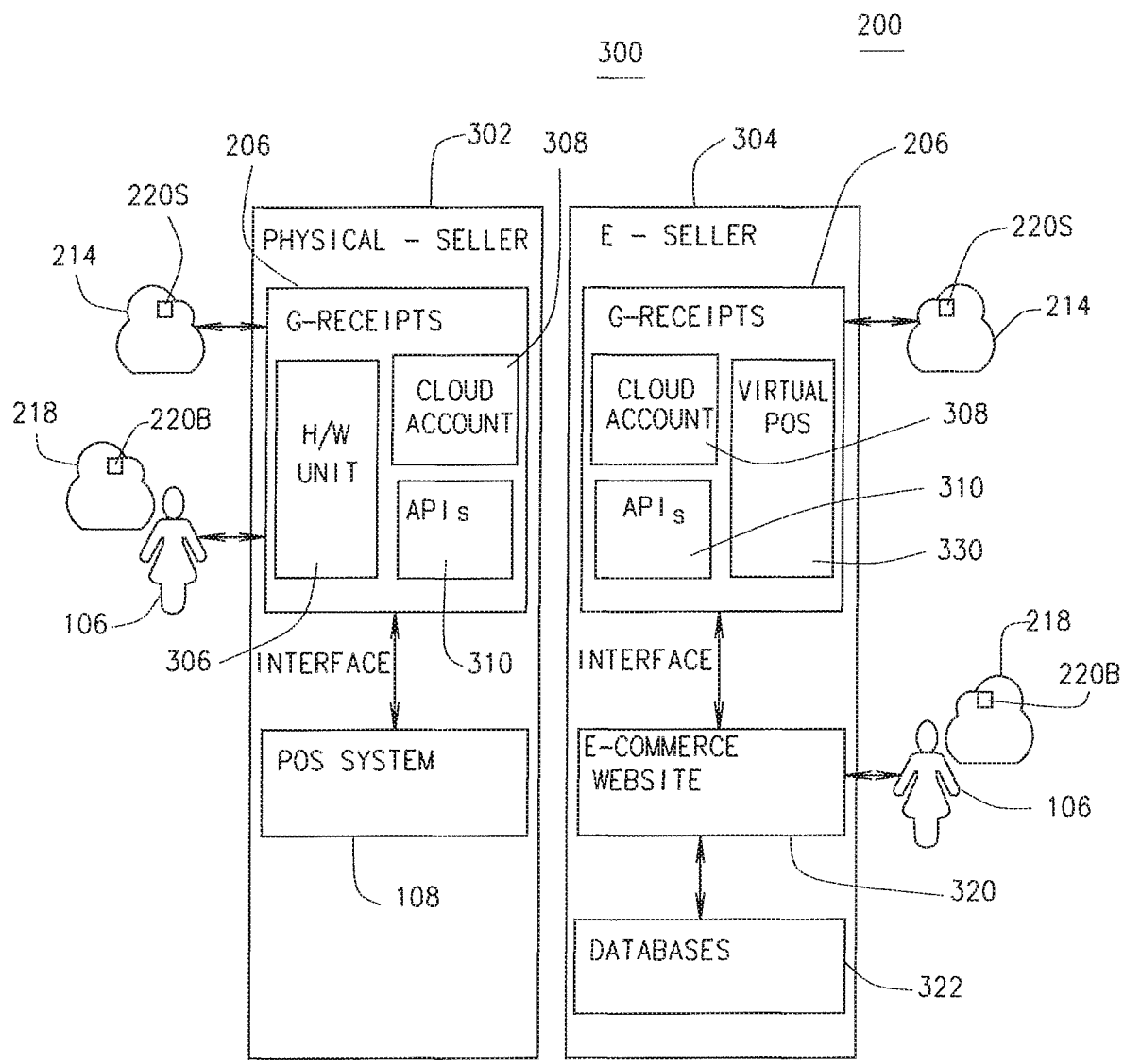
FIG. 5A is a block diagram of an exemplary embodiment of an electronic digitized transaction receipt system with some of its internal components and functional system according to another exemplary embodiment.
Figure 5B:
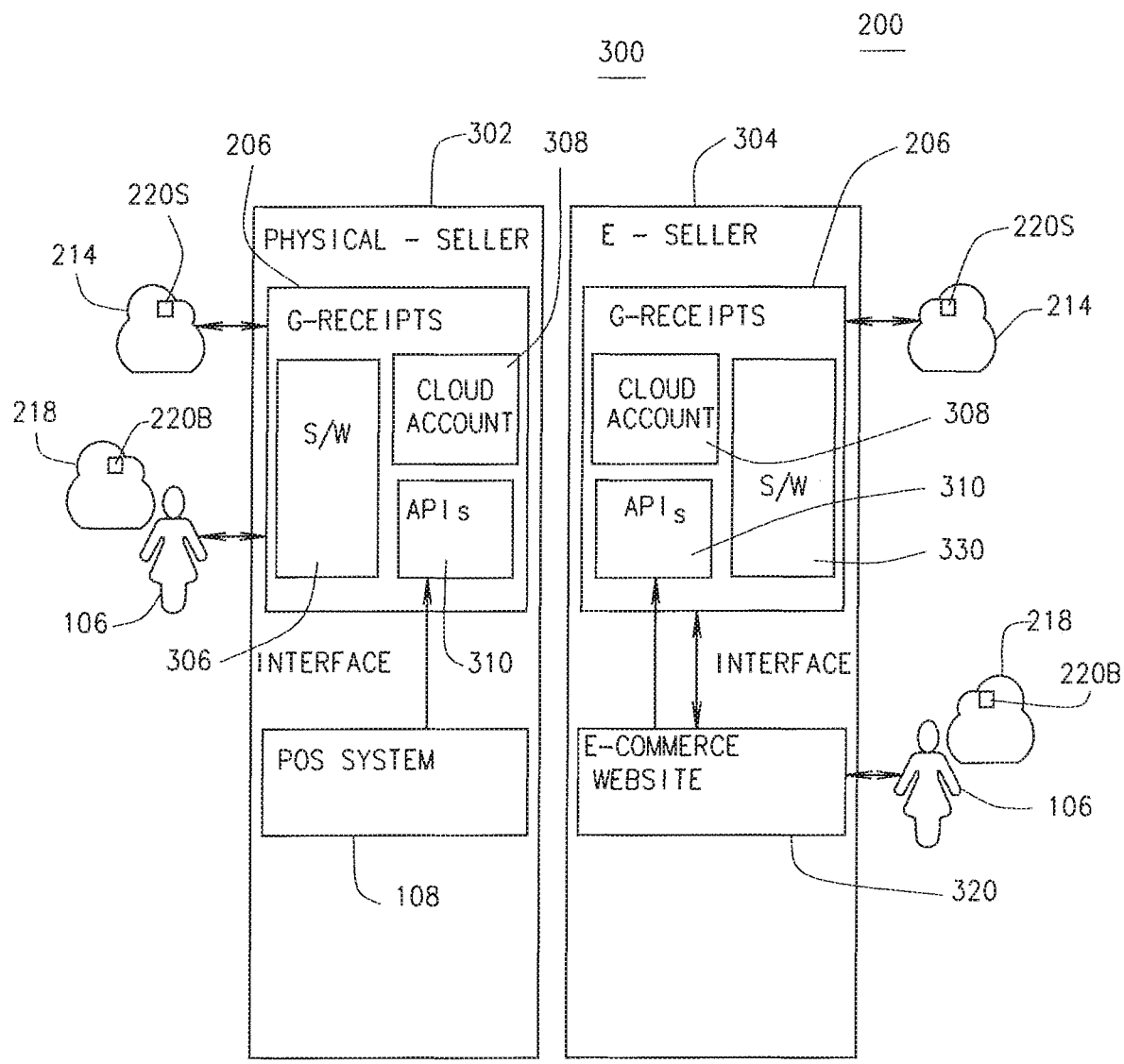
FIG. 5B is a block diagram of another exemplary embodiment of an electronic digitized transaction receipt system illustrating internal components and function between systems wherein the seller is an e-seller in a according to another exemplary embodiment.

FIGS. 5A and 5B are block diagrams of two exemplary embodiment of an electronic digitized transaction receipt system, each showing various components and functional system according to another exemplary embodiment. Shown in FIG. 5A are two examples of component implementation 300 of system 200 features from the perspective of two different types of sellers 102. On the left of FIG. 5 is a physical seller DRS implementation 302 with buyer 106 and BDR memory 218 with the BDR 220B stored therein. The seller system 102 has the SDR 220S stored in the SDR memory 214. The DTPS 206 includes a memory or cloud account module 308, one or more application programming interfaces (APIs) 310, and a processor and memory or hardware implementation 306. The DTPS 206 includes an interface to the seller-specific PPS (POS) system 108. While similar, for an e-commerce seller system 304, the DTPS 206 further includes a virtual POS module 330 as many e-commerce sellers 102 do not have their own PPS 108. Through use of the various interfaces and analytics of the DTPS 206, the DTPS 206 in system 304 can enable and offer the e-commerce seller system 102 through use of the system GUI a virtual POS 330 for managing their account, inventory, digital receipts (DTR 220), buyer accounts, and similar functions. Further, through the interface to the e-commerce seller system 102 e-commerce seller website 320, the DTPS 206 can enable the e-commerce seller website 320 with the ability to display and collect BDR identifiers and instructions from buyers 106 to create a DTR 220 in lieu of on-screen, printable, or emailed copies of the prior art receipt 116. The DTPS 206 can also interface directly or indirectly through the e-commerce seller website 320 to third party or seller databases 322.

Referring now to FIG. 5B illustrates a modified embodiment of FIG. 5A that reflects the differences between how a physical store seller POS 108 and therefore the seller 101 received and obtains the DR buyer ID as compared to an e-commerce seller PPS 108 wherein the buyer 106 has an e-commerce purchase transaction 105. In some embodiments, one of the differences is the mechanism that the seller 101 or the seller POS/PPS 108 obtains the DR buyer ID for processing of the purchase transaction 105 through or with the DRS system 200 or DRTPS 206 for obtaining the DTR 220. The capabilities of the physical sellers 101 and the e-commerce sellers 101 are similar, these capabilities may different especially as related to the DTR 220 cancellation for a buyer 106. FIG. 5B illustrates on the left, the system 100 components and process flows that are required and also not required for a physical seller 105 and their systems 302. As shown, the POS system 108 does not interface to the system 206 but directly interfaces to the API 310. The Buyer 106 directly provides the DR Buyer ID to the DTS software application 306. Whereas on the right, the process components and process flows that are required and not required for an e-commerce seller 105 and their system 304 are illustrated. As shown, the e-commerce website 320 directly interfaces to the DR buyer 106 and does not need database 322. The e-commerce web-site interfaces directly to the DTS system 206 through an API 310 and the DTS 206 does not provide support by having to provide a virtual POS 108 as is often the case in a physical seller 101 embodiment.

Figure 6A:
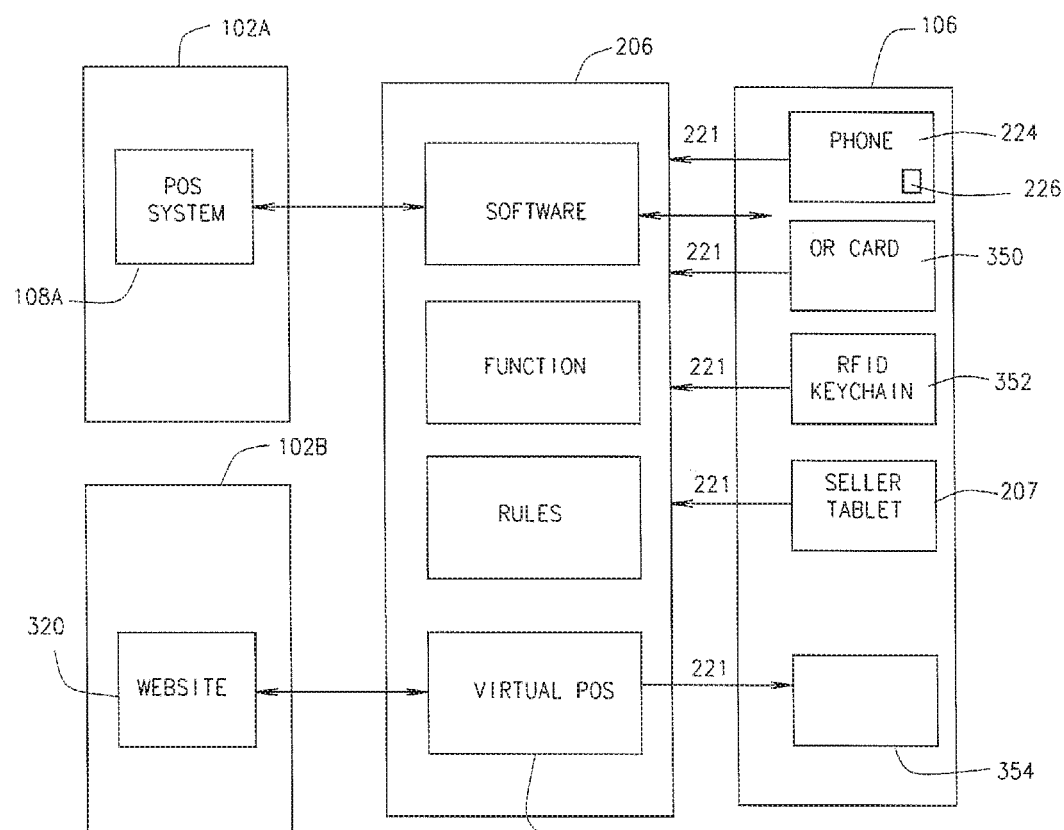
FIG. 6A is a block diagram of another exemplary embodiment of an electronic digitized transaction receipt system according to another exemplary embodiment.
Figure 6B:
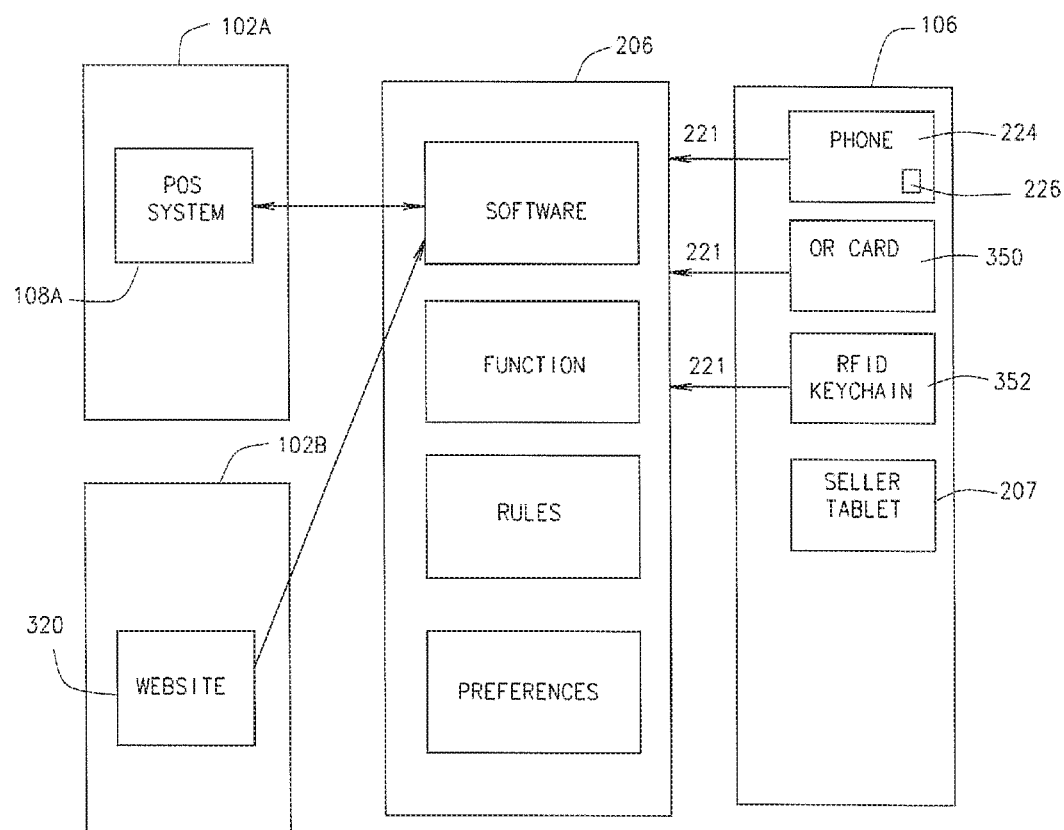
FIG. 6B is a block diagram of another exemplary embodiment of an electronic digitized transaction receipt system according to another exemplary embodiment.

FIGS. 6A and 6B are block diagrams of additional exemplary embodiments of digital receipts system 100 using a digital transaction receipt DRTPS system 206 and its processes and components. As shown in FIG. 6A, seller system 102A has its own PPS (POS) 108A that is coupled to the DTPS 206 system that can include, in some embodiments the SDTS 202. This includes software, functionality, rules and support for the aforementioned virtual POS 330. From the buyer 106, there are various means for interfacing with the DRS 200, DTPS 206 and/or SDTS 202 as shown on the right. These include the buyer mobile device 224 equipped with the BDR mobile application 226, a BDR card 305 such as a QR card, an RFID keychain 352, the sellers digital receipts tablet or mobile device 207 configured with digital receipts software or application or coupled to, or operating a portion of, the SDTS 202 functionality and a buyers website or program 354. While not shown, this can include other buyer means such as an application with NFC, etc. Each of these can provide the BDR identifier and/or digital receipts confirmation 221.

Referring now to FIG. 6B, illustrates an e-commerce implementation of the system 100 of FIG. 6A reflecting those implementations and functions that are not required in an e-commerce embodiment. As shown, since the e-commerce purchase transaction 105 is performed from the website 320 that also include the POS/PPS system 108A, the DRTPS 206 directly interfaces with each from the seller functionality and functionally interfaces between the e-commerce website 320 of the seller system 102b and the buyer 106. The buyer 106 has a byer interface device 224, such as a mobile phone 224 having a DR mobile application 226, a QR card 350, or a RFID keychain 352.

Figure 6C:
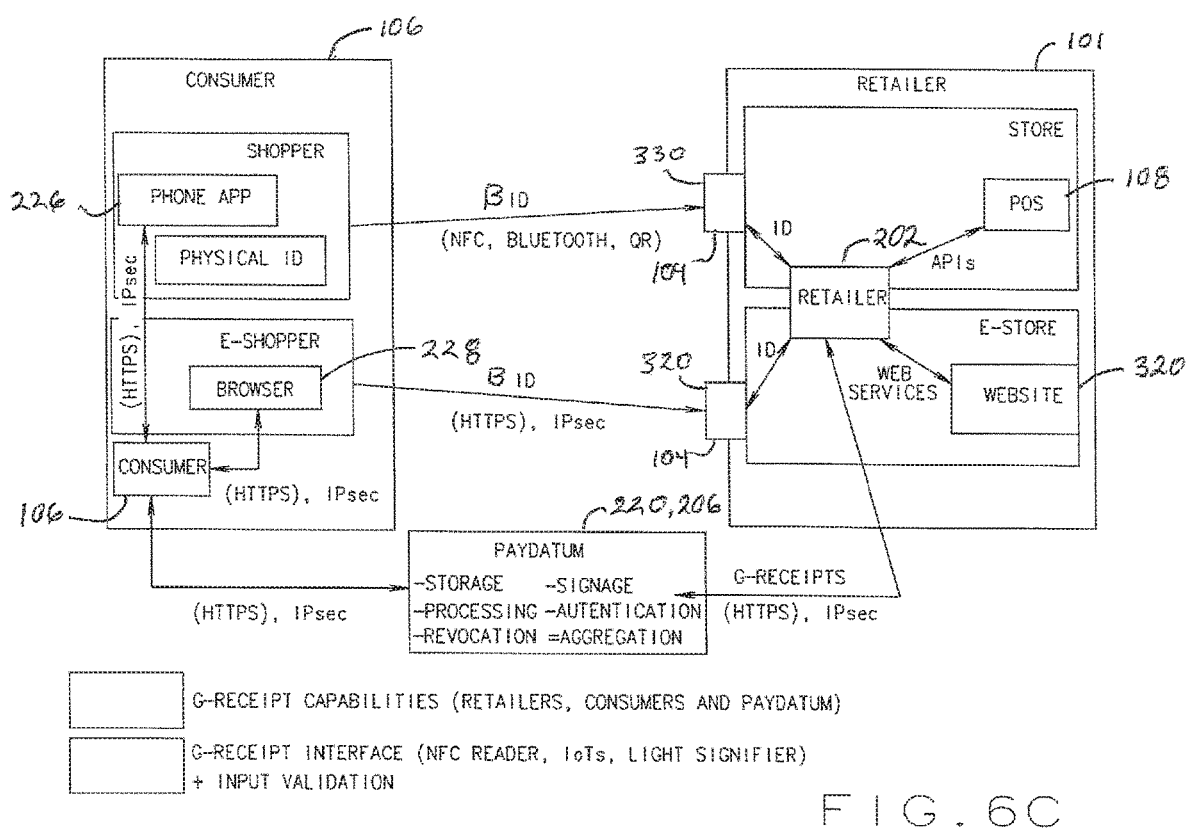
FIG. 6C is a block diagram of another exemplary embodiment of an electronic digitized transaction receipt system according to another exemplary embodiment.

FIG. 6C illustrates a message flow diagram of some embodiments of the systems of FIGS. 6A and 6B. As shown in FIG. 6, the buyer 106, from different times, can make a purchase transaction 105 using a mobile phone application 226 at a physical store 101 wherein the DR Buyer ID is provided to interface 330 via NFC, Bluetooth or QR code by way of examples. The seller POS 108 can include the seller digital transaction system 202 that interfaces to DRTPS 206 or a full DTS 200 for providing the transaction data including the received DR Buyer ID, the Seller ID, and the transaction payment 114, type of transaction payment 115, and the identification of the purchased goods and services 112. In another purchase transaction 105, the same buyer 101 may make an e-commerce purchase transaction 105 using a browser 228 to access the hosted website 320 of the e-commerce seller 101 having seller digital transaction system 202 for receiving the full transaction data including the DR Buyer ID and that interfaces with DRTPS 206 or with a DTS 200 for providing the transaction data including the received DR Buyer ID, the Seller ID, and the transaction payment 114, type of transaction payment 115, and the identification of the purchased goods and services 112.

Figure 7:
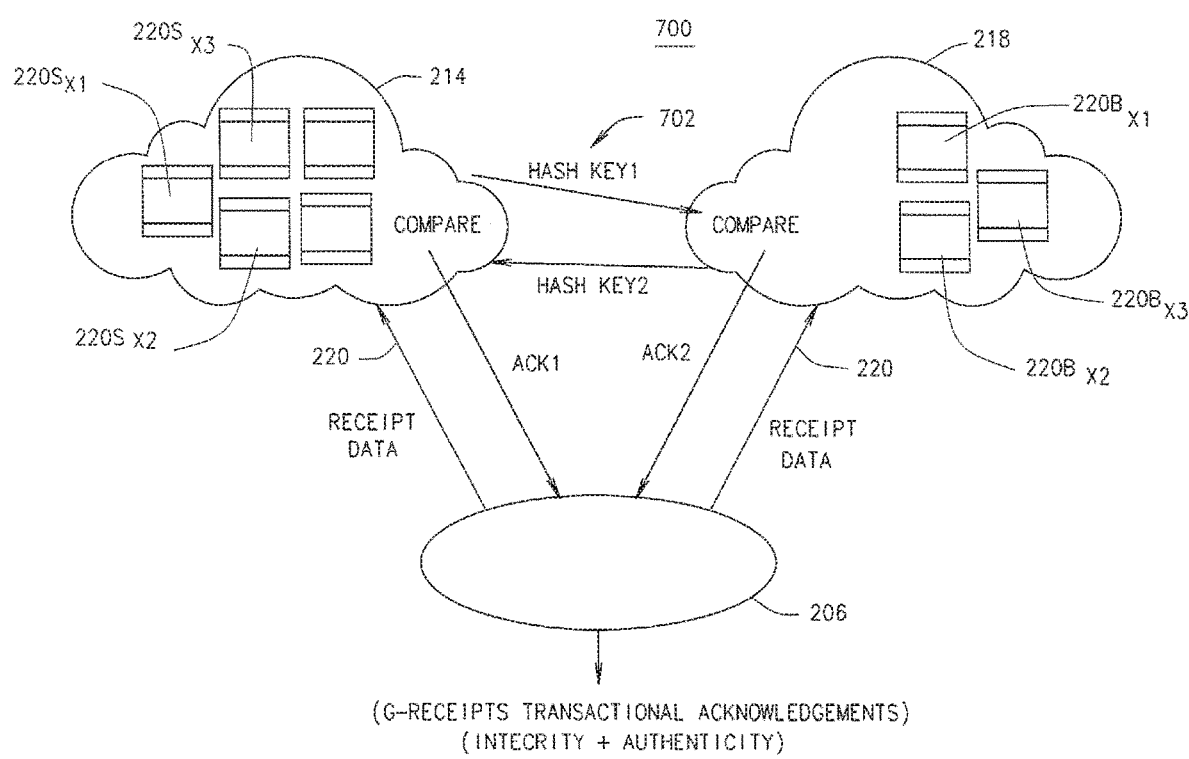
FIG. 7 is a diagram of an exemplary embodiment of an electronic digitized transaction receipt system with digital receipt integrity and authenticity processes between the buyer and seller copies of the same digital receipts according to one exemplary embodiment.

FIG. 7 is a diagram of an exemplary embodiment of an electronic digitized transaction receipt system with digital receipt integrity and authenticity processes between the buyer and seller copies of the same digital receipts according to one exemplary embodiment. As discussed above, while all seller copies of digital receipts DTR 220S (shown as 220SX1, 220DX2, 2220SX3) are stored in each of the seller specific seller digital receipt memory 214, a copy is also stored in each of the buyer-specific BDR memory 218 for each buyer (shown as 220BX1, 220BX2, 220BX3). The DTPS 206 manages and administers the BDR memory 218 and the SDR memory 214 without access to the memories themselves by initiating an integrity and authentication process 700 using an authentication process 702 directly between the SDR memory 214 and the BDR memory 218 so that each of the stored DTRs 220 are identical; even though, each may have their own additional layered taxonomy added by the seller or the buyer, as discussed above. Process 700 includes a process of sending the seller DTR 220S and the buyer DTR 220B, then having the two memory systems 214 and 218 perform a hash key comparison, and then sending an acknowledgment back to the DTPS acknowledging the integrity, authenticity and validity of the two stored DTRs 220S and 220B.

Figure 8:
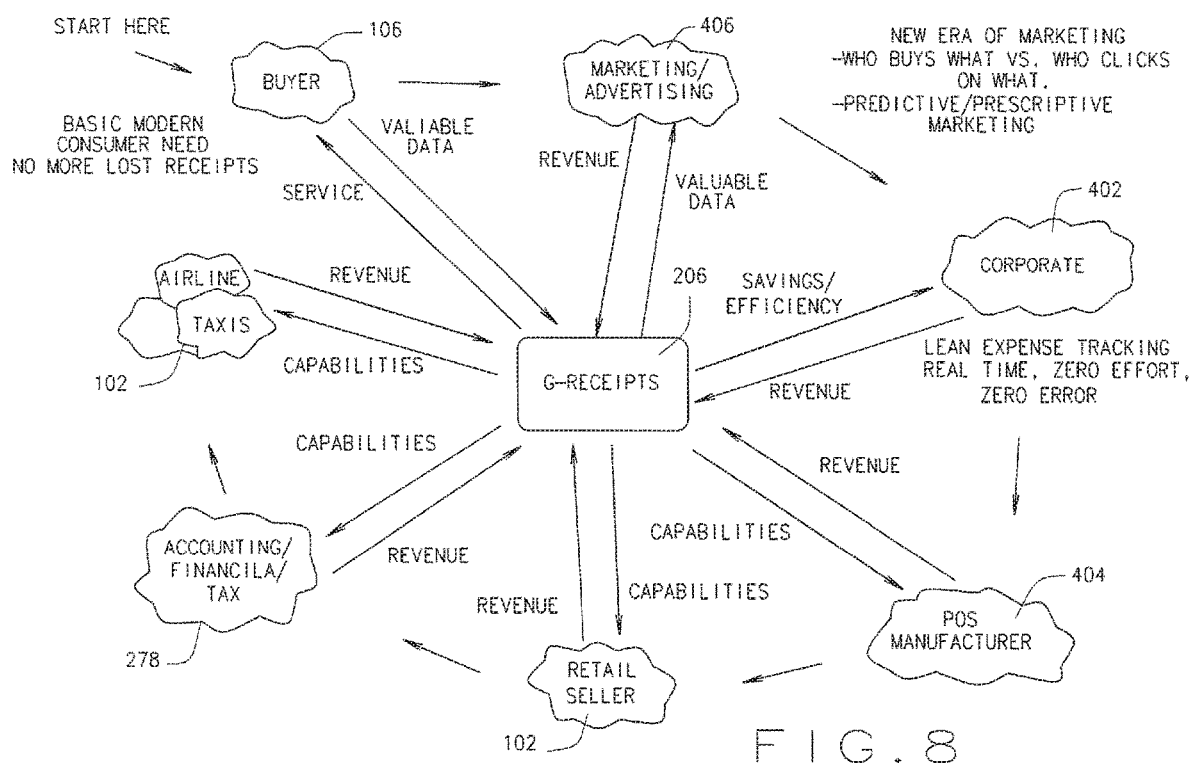
FIG. 8 is a diagram illustrating the functional interfaces and new capabilities and value added features enabled by the described digital receipts system according to one embodiment.

FIG. 8 is a diagram illustrating the functional interfaces and new capabilities and value added features enabled by the described digital receipts system according to one embodiment. As shown in this illustration, the DTS 200, and in particular the DRTPS 206 through its described interfaces and functionality can provide significant improvements and value added capabilities that no current system can offer. One or more of these features are enabled such as having a fully digitized copy of the transaction receipt data for each and every DTR 220 that identifies all of the purchased products and services 112, their price and quantity, and the seller identification and date and time of a purchase, as well as other seller specific data. Further, through use of the DTPS 206 layered taxonomy, all DTRs 220 and the stored DTR 200 data are identified with predefined nomenclature and common, at least for layer one and layer two assignments for the seller and the purchased products (independent of the seller 101), the type or affiliation of the sellers 102, and the type of seller-specific payment processing system PPS 108 used for each DTR 220 or transaction 105. As such, individually each of the SDR memory 214 stored DTRs 220S and the data contained therein and the BDR memory 218 stored DTRs 220B and the data contained therein, have a common data structure that enables new and improved features and services not here before possible, each also being independent of the form of transaction payment 114 used by the many buyers 106 of each seller 101.

As such shown, from the top right of FIG. 8, the system 200 can enable buyers 106 with the DTRs 220 that are stored and cannot be lost, that are from all sellers 102 and for all purchase transactions 105, regardless of the type 115 of transaction payment 114. As such, each buyer 106 has a new replacement digitized DTR 220 and can obtain valuable automated buyer-specific analytical data as to all of their transaction purchases 105. A new capability, as described herein is for a marketing or advertising entity 407 to obtain actual transaction sales data for each of the sellers or purchased products, but independent of an identification of the specific buyer thus to protect the buyer's identity. This is a new service and capability enabled by the seller stored seller DTRs 220S and the analytics and interfaces as described herein. These marketing and advertising entities 406 do not have to rely on clicks (or click attempts) or third party data; but can, as a service of the DTPS 206, obtain actual transaction purchase statistics and analytics from the DTRs 220S and from the layered and common taxonomy applied to all transactions regardless of seller system 102 or payment type 114. This same applies for corporations 403 that utilize the parent account and access capabilities for each of its employees from the buyer side and for each of its seller stores or agents from the seller side. A further improvement on the seller side is the ability to provide new and improved features to the PPS (POS) 108 systems and capabilities currently used or as will be implemented. By having the DTR 220 data created with the taxonomy applied on a consistent basis, these PPS 108 systems can develop new and improved capabilities for each and every seller 101 that utilizes their PPS 108. Of course the benefits to the sellers such as airlines, taxis, retail stores, e-commerce and other sellers is evident as they reduce the cost of having to produce paper receipts or generate emails, and are enabled for improved purchased products management, inventory control, and analytics not here before capable. As also noted, one or more of these system users can utilize the DTPS 2016 and its taxonomy module 290 and the taxonomy analytics interfaces 292 and the ability to add higher level or additional taxonomy to the base taxonomy for providing customized accounting, inventor, financial and tax data outputs 279. Of course, one of skill in the art will understand that FIG. 8 is only illustrative of some of the many interfaces and users and some of the benefits imparted by the present disclosed DRS 200 system and methods.

Figure 9:
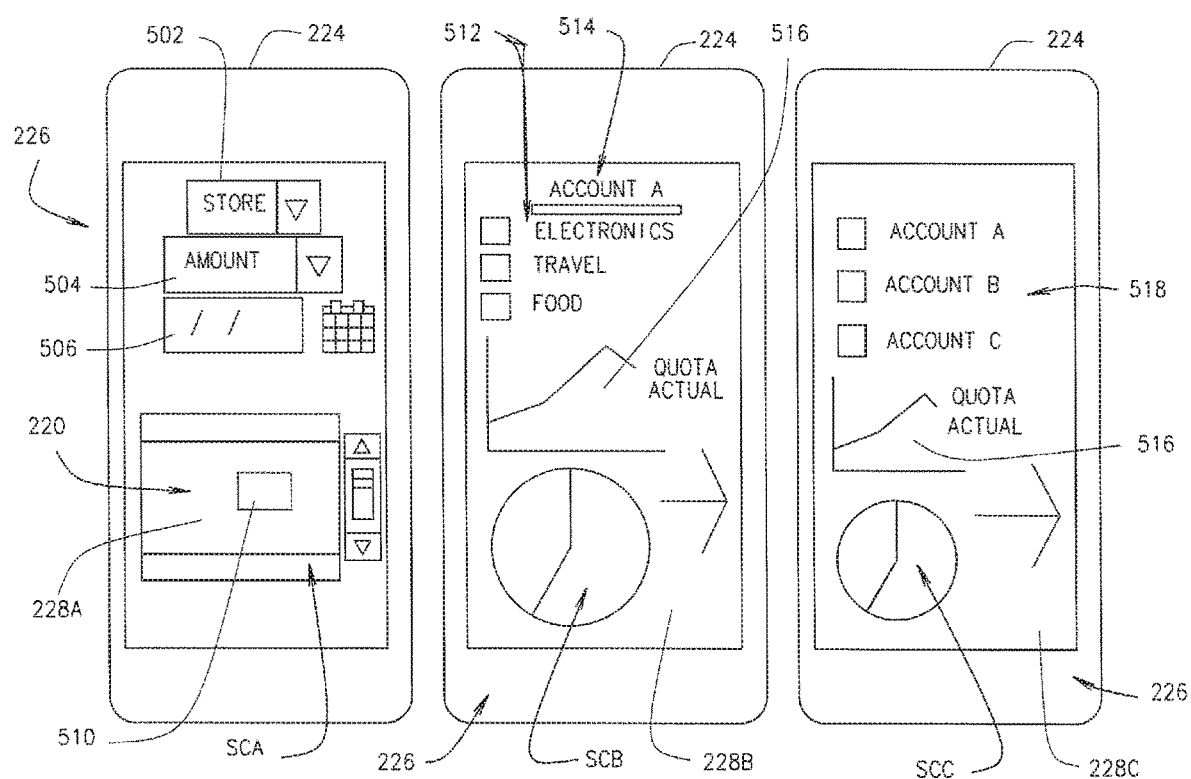
FIG. 9 is an illustration of a digital receipts mobile phone application graphic user interface showing digital receipt review and buyer analytics according to one exemplary embodiment.

FIG. 9 is an illustration of a digital receipts mobile phone application 226 and buyers GUI 228 showing digital receipt review and buyer analytics according to one exemplary embodiment. As shown are three screen illustrations of the buyer GUI 228 (shown as 228A, 228B, 228C) for the BDR application 226 that is loaded on the buyer mobile device 224. As shown on the right, the buyer mobile digital receipts GUI can present to the buyer 106 a display 502 that allows for the selection of a seller or store, a transaction purchase amount 504 and a purchase date 506. As shown is screen display SCA, the DTR 220 can be displayed that contains all of the transaction data 510 within that DTR 220. Similarly in GUI 228B, the buyer 106 is presented with a selection of an account 514, or the type of purchase 512 typically defined within the digital receipts taxonomy layers. The GUI 228B can also include graphical displayed analytics 516 and SCB.

As shown in GUI 228C, a parent buyer account can select a child account 518 in order to search and receive the DTRs 220B of each child buyer 106 within their authorized parent account. For each selected Child Account A, B and C, buyer specific analytics 516 can be displayed and the SCC. Of course, there are only three exemplary embodiments of a buyer digital receipts mobile application graphic user interface 228. Additional ones are possible and unlimited. Further, similar interfaces are enabled for each seller 101 and each parent seller 101 and the seller systems 102 in a similar manner.

Figure 10:
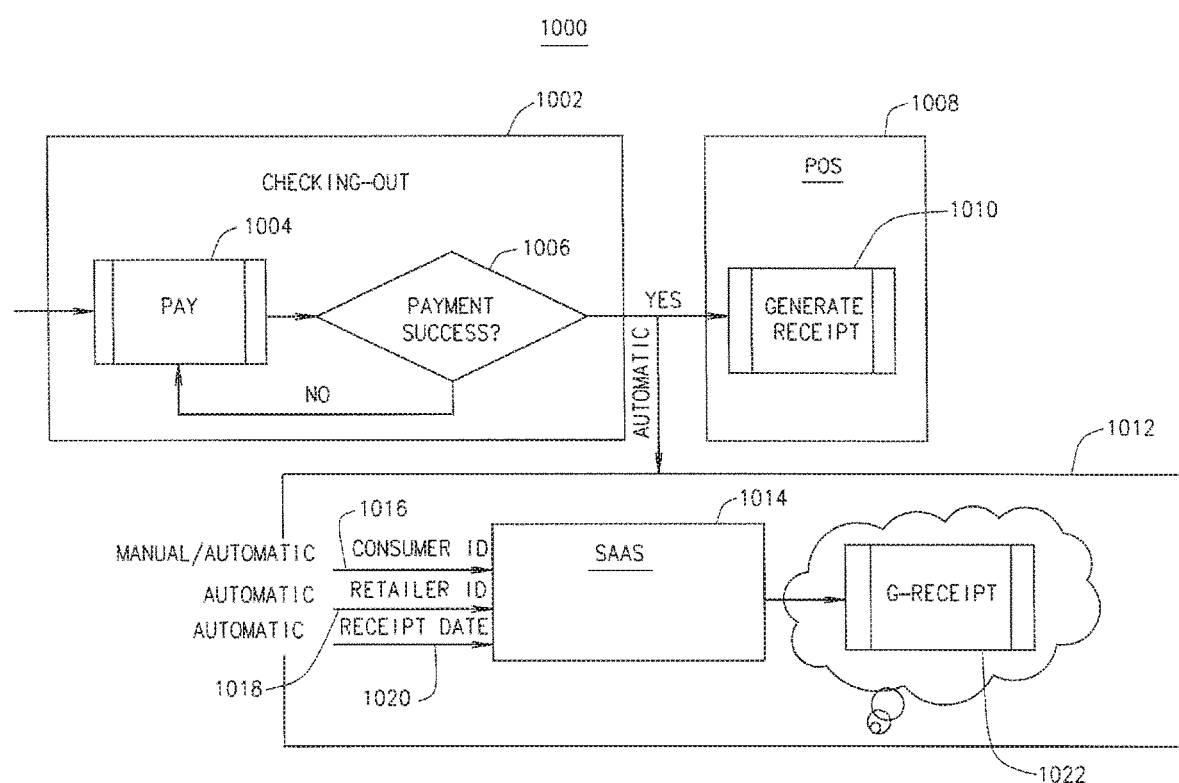
FIG. 10 is a block diagram of an exemplary embodiment of an electronic digitized transaction G-receipt system using a SaaS service in support thereof according to another exemplary embodiment.

Referring now to FIG. 10, process 1000 is a block flow diagram of an exemplary embodiment of an electronic digitized transaction G-receipt system process using a SaaS service. At this process, the consumer identification or ID of the buyer 106 is either obtained manually or by an automated process at the time of the purchase or checking out. Of course each seller also has a seller identification that is unique to them which is typically automatically obtained from the POS system 108 by way of example. In process 1000, in seller system 1002, the buyer makes payment in process 1004 and the system and if the payment is not successful in 1006, the payment process is sent back to the payment process of 1004. If a successful payment in 1006, the receipt data such as the transaction details, the buyer ID and the payment are sent to the point of sale terminal in process 1008 wherein a local receipt 115 is generated by process 1010, such as is in the prior art. The process 1010 may or may not use the new G-Receipts buyer ID on the local receipt 115. However, in the process 1000, this same transfer of receipt data including the buyer ID, the transaction details, the seller ID and the payment information is provided automatically to the digital receipts system process of 1012. This is typically provided automatically through an API related to the POS 108 of the seller 101 or from the ecommerce site or server for web-based services. The digital receipts system 200 or the DRTPS 206 specifically can be implemented as SaaS receives the consumer ID 1016, the seller ID 1018 and the receipt data 1020, and generates the digital transaction receipt 220 for the transaction in process 2022.

Figure 11:
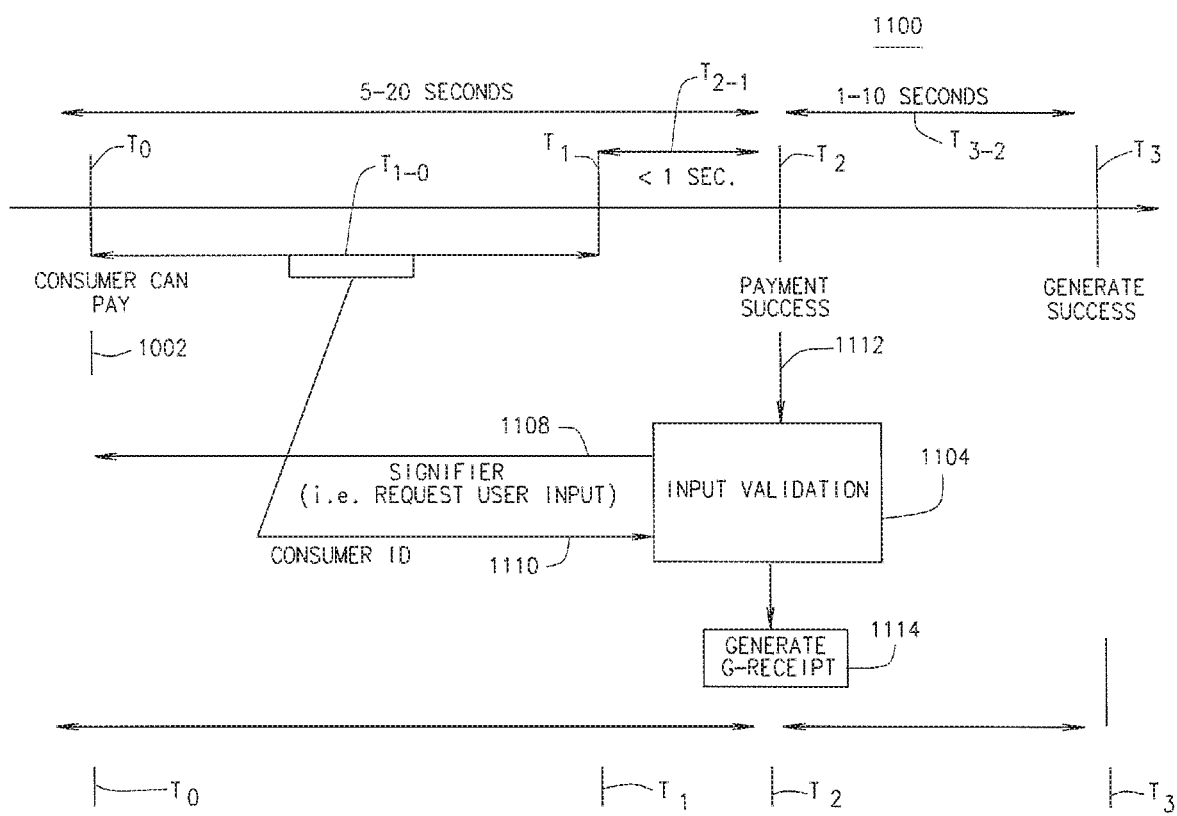
FIG. 11 is a time diagram of one exemplary embodiment of an electronic digitized transaction receipt system illustrating a consumer ID manual entry process according to one exemplary embodiment.

FIG. 11 provides one exemplary time diagram 1100 illustrating an electronic digitized transaction receipt system process having manual consumer ID entry at the time of the transaction. Timing diagram 1100 provides an exemplary embodiment wherein the consumer's payment method is not configured to send an automated consumer ID to the digital transaction receipt system 200 or DRTPS 206, and as such, the consumer buyer 106 is prompted or otherwise provides the seller's transaction interface 104 with a manually entered consumer or digital receipts (DR) buyer ID in conjunction with the buyer making their payment, whether by credit card, by scanned QR code or by Phone RFID, NFC or other method of payment. The seller's transaction interface 104 provides the buyer 106 with a entry window on a graphical user interface or via a prompt for entering the buyer's DR byer ID. As shown in FIG. 11, this process should not delay the transaction as the process should not take more than about 2 seconds in a window of time that is usually between 5 and 20 seconds. The process starts at time $T_0$ 1102 when the buyer 106 is prompted to make a payment for the purchase transaction. At time $T_0$ 1102, the seller's transaction interface 104 or another system such as the POS or PPS system 108 prompts the buyer 106 with a signifier 1108 requesting or prompting the buyer 106 to enter the buyer's DR buyer ID into a validation input system 1104. The buyer 106 enters by manual or electronic means the buyer's DR buyer ID before time $T_1$ (identified as $T_{1\text{-}0}$) and when received the received DR buyer ID is entered at 1110 in process of system 1104 for validation. The validation is performed by validation system 1104 between time $T_2$ (identified as $T_{2\text{-}1}$) where upon the validation system receives a transaction payment success indicator from the seller's POS or PPS system 108 that includes details of the transaction such as the receipt data, payment amount and seller ID in process flow 1112. The DR validation system 1104 then transmits the received transaction data including the DR buyer ID to the DRTPS 206 in process 1114 at time $T_2$. The DTR 220 is generated in the next 1 to 10 seconds by time $T_3$ (shown as $T_{3\text{-}2}$). As another exemplary embodiment, at the time of DR Buyer 106 access to the seller payment interface 104, a DR receipt objection can be instantiation and initial DR data populated in a DR data packet such as DR metadata, as described below. At this, a timer can start and provide the DR transaction message and wait for the buyer ID and the success of the buyer provided transaction payment. In this process the buyer ID is provided at the time of payment approval and the DTR 220 is authenticated and digitally signed and saved in the DTS 200 or DRTPS 206 at which time the timer expires. If the POS 208 has to wait on the receipt of the buyer ID, the process can be configured to automatically time out after a predetermined period of time.

FIG. 11 illustrates just one example. The DR interface can be configured to read the DR buyer ID, validate it (to include the DR validation system 1104 therein) and deliver the DR buyer ID to the seller's POS or PPS system 108, which in turn provides it to the DRS system 200. This can be enabled by enhancement or modification directly or as a separate module to legacy or new seller's POS or PPS systems 108 for providing interface 104, or be a standalone device and system. In e-commerce applications, this can be provided as an additional data entry field on the e-commerce seller's check out GUI presentation to the buyer 106. In physical stores, the seller DR interface 104 can either provide for buyer manual input as described above and in FIG. 11 or can provide for it being automatically entered at the time of payment, such as being associated with the buyer's payment device or type of transaction payment 115, such as the credit card or electronic payment means. A DR receipt 220 can be instantiated by that time and the buyer 106 can be prompted to enter the DR buyer ID, or to verify during the purchase payment window, acceptance of the transaction. If a DR receipt is not given at the time of the transaction 105, the previous DR receipt 220 is marked as an orphan and the seller 101 can manually or the seller's POS or PPS system 108 can be configured to go back and retrieve the orphaned transaction if the buyer subsequently desires to have the DR receipt 220 generated.

Figure 12:
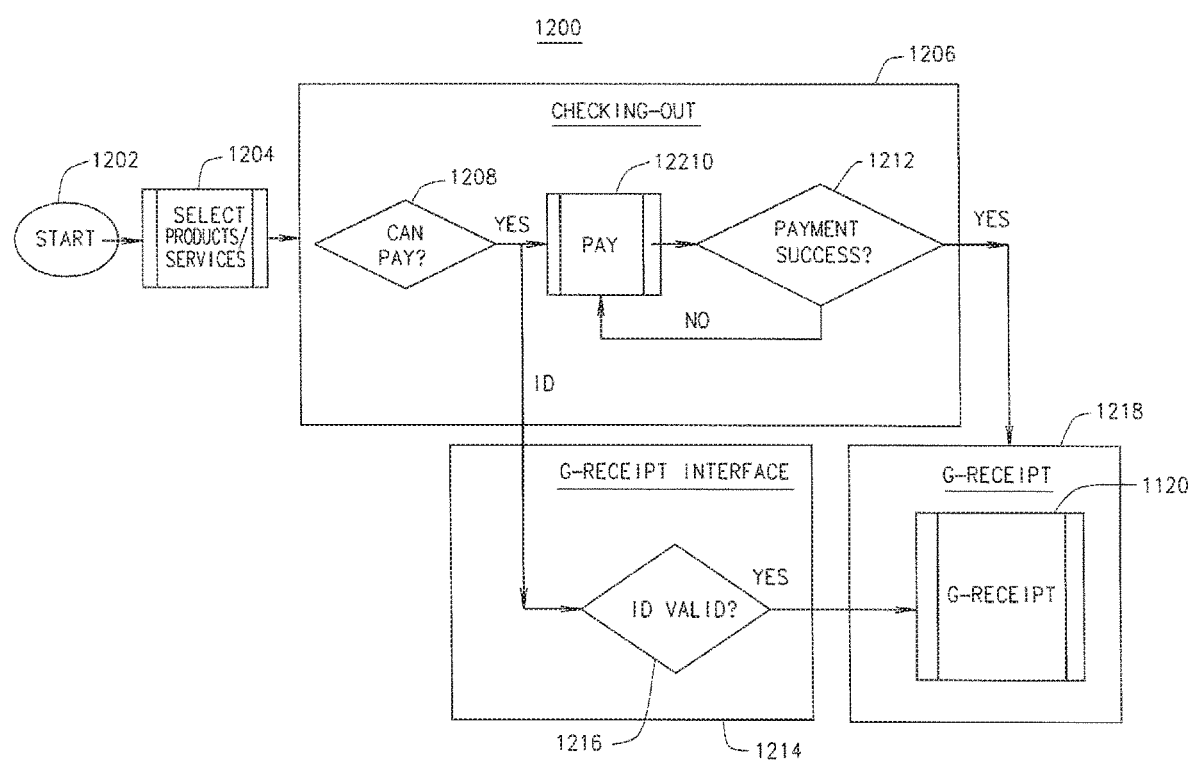
FIG. 12 is a diagram and process flow of an exemplary embodiment of an electronic digitized transaction receipt system with digital G-receipt illustrating the G-receipt generation process according to one exemplary embodiment.

FIG. 12 is process flow 1200 of an exemplary embodiment of an electronic digitized transaction receipt method illustrating a G-receipt 220 generation. Process 1200 starts at 1201 and continues where the buyer 2016 selects a purchase item 112 in process 1204. The method continues is the seller process system 1206 by prompting for payment in process 1208, and receiving payment in process 1210. The transaction receipt data is also provided to the digital receipts system 1214 to verify the buyer ID in process 1216, as the buyer 106 selected a digital transaction receipt 220 at the time of checkout of the online purchase. The online seller's store system 1206 processes the payment and purchase in process 1212 as traditionally or normally handled by the seller 101 but also then provided the digital receipts system 1218 the transaction receipt data wherein the digital transaction receipt 220 is generated in process 1220.

In some embodiments, the various DR receipts system 200 provides the following to each of the constituents involved in a purchase payment transaction 105. For the buyer 106, these can include auto-classification of each transaction 105, auto-analysis of multiple purchase transactions 105 of the buyer 106 or groups of buyer 106 such as if a child buyer 106 that is within a parent buyer 106 group. The DTR 220 can be exported by the buyer for saving or allocating or printing, just as paper receipts are done today. All DTR 220 from all transactions can be searched by the buyer such as by type, payment type, or by classification or seller. The buyer 106 can also sign a DTR 220 after the transaction 105 if the buyer did not sign at the time of the transaction 105. As to the seller 101, the seller can generation DTR 220 for each transaction at a location or by group, initiate a cancellation or voiding of a DTR 220 or a purchase transaction within a DTR 220. The seller 101 can search by purchased item 112 or by DR buyer ID. The seller 101 can establish push notifications based on predetermined criteria such as alerts to a seller manager as to particular buyers 105 or purchased products 112. The seller 101 can aggregate multiple seller locations for inventory and financial management and control. The seller 101 can link or otherwise utilize a DTR 220 to a seller award, customer loyalty program or to a product or seller warranty. The DRS 200 can provide for digital signatures or certificates for transactions 105 and each DTR 220, provide a new analytics services to buyers 105, to sellers 101 and to third parties, that includes all or a defined portion of purchased goods and services 112, sellers 101, buyers 105 and digital receipts DTR 220, which can be by geographic area, by demographics, or otherwise. As to the sellers 101 and the third parties, such analytics and services can be provided so that the identification of the buyers is not provided, as in some embodiments, the DRS 200 does not retain or store the identification of the buyer 106 or their purchase payment type 115 or method. In this manner, the DRS 200 can ensure buyer 106 privacy as no buyer data is stored that can be hacked or stolen or used or accessed by a third party.

As described herein the communications with the DRS 200 or the DRTPS 206 can include the transmission of a DTR 220 that is a data packet having DR metadata and DR transaction receipt data. The DR metadata can include the seller ID, the DR Buyer ID, an ID for a orphan purchase transaction as well as a unique DR transactions ID. Typically the DR transaction receipt data only includes the typical legacy transaction data such that the buyer and seller can see on a printed or emailed receipt that includes the listing of the purchased goods in the transaction and the payment amount and possible the last four digits of the credit card, or the like, and possibly a seller receipt barcode or the like. These can include a detailed listing of the purchased goods, including the inventor number and name, manufacture code, product code or UPC code. In a DTR 220, the DR metadata is not available to and cannot be seen by either the seller or the buyer, as they can only see the transaction data. In some embodiments, the DTR 220 data packet can also include a status ID of the DTR 220, such as being active or void, and can include with the metadata the above described taxonomy. The DRS 200 or the DRTPS 206 can provide a digital certificate such as a AWS Certificate Manager function signed by the DRS 200 or DRTPS 206 and provide certain authorization rights such as seller and buyer account authorizations, logs, and object pointers. cant As described herein, the buyer 106 can utilize a buyer device 222 such as a mobile phone 224 or tablet or a seller device having a seller interface 104. In one such embodiment, such a device can be a mobile phone 224 having a mobile DR receipts application 226 with a user interface or GUI 228. Such a buyer GUI 228 can present to the buyer, initialization of the DR application and service such as including emails and phone numbers, passwords and buyer account customization including preferences, DR receipts searching tools, DR notifications and alerts for the buyer and child buyer and parent buyers, DR seller or manufacturer promotions or rewards, warranty information, buyer analytics and other buyer services. By way of example, the GUI 228 can be configured to enable the buyer to void a DR receipt 220 or to request a warranty or the delivery of a paper receipt or DR receipt report. Each DR receipt 220 can be displayed on the GUI 228 to provide the buyer with the complete content of the transaction receipt as if they had a paper receipt. The DR receipts application can include, in some embodiment, character recognition support to enable not only the display of the original received seller receipt of the transaction, but also to populate the DR receipt content with searchable and identifiable content. A different GUI 228 can be provide a parent buyer that enables the parent buyer to manage two or more child buyer DR receipts and accounts and a child buyer that is limited to that single child buyer. As another option, the GUI 228 can include social network links enabling the user to provide social network postings relative to their new transaction purchase such as "I have just purchased a new car from ACME dealer. I got a great deal." In other embodiments, the GUI 228 can help the buyer in determining the proper amount of tip to be paid at the time of the transaction and such can be included on the DTR 220.

On the seller side, the DRS 200 or DRTPS 206 can provide the seller 101 with notifications as to a buyers pending action, to prompt as to offering store credit or a reward or a warranty. The parent and child relationships can be implemented on the seller side as well such as where a physical store or e-commerce store has multiple locations all being the responsibility of a single entity or person that acts as the parent over each child store or seller. Further, the DRS 200 or DRTPS 206 can provide new functionality to the seller 101 by new DR functions such as voiding, issuing, re-scanning, and searching DTR 220 individually or as a group, and in real time or near real time of a purchase transaction. A function ID can be established for a seller based on their seller ID and can be customized such as by setting functions, parameters for those functions, authorizations, and timers.

Computer Environment

The systems, platforms, servers, applications, modules, programs, and methods described herein include one or more a digital processing devices. Each digital processing device can include one or more hardware central processing units (CPU) that carry out the functions of the device. The digital processing device includes an operating system configured to perform executable instructions for the operation thereof. In most embodiments, the digital processing device includes one or more memory devices, a display, one or more input devices, and a sound output device. In some embodiments, the digital processing device is connected to one or more data networks such as a mobile network, a wireless network such as a Wi-Fi or Bluetooth network or a wired data network. These data networks can be utilize to access the Internet or an intranet such as for accesses to the World Wide Web or other Internet based services. These can include, but are not limited to such data network accessible systems or applications such as a data storage device, a cloud service, an application server, a terminal or exchange server. In some embodiments, the digital processing device is a non-portable device, such as a server or a desktop computer but in many embodiments it can be a portable device, such as a laptop, tablet computer, a mobile telephone device or a digital audio player.

As noted, the digital processing device includes an operating system configured to perform executable instructions. The operating system can include software, including programs and data, which manages the device's hardware and provides services for execution of software applications/modules. Those of skill in the art will recognize that suitable operating systems include, by way of non-limiting examples, Apple OS, Microsoft Windows, Microsoft®, Windows®, Apple.® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian®, OS, Apple® iOS®, Research In Motion® BlackBerry OS®, Google® Android®, Microsoft® Windows Phone®, OS, Microsoft® Windows Mobile®, OS, Linux®, and Palm® WebOS®, As noted, the digital processing device typically includes one or more memory device or storage devices. The memory is store data including operating system, programs, applications, user data, and application data on a temporary or permanent basis. In some embodiments, the memory is volatile and requires power to maintain stored information but can also be non-volatile and retains stored information when the digital processing device is not powered. Further, the memory can be located with the digital processing devices or can be attachable thereto either physically or via a data network connection to a remote memory.

The digital processing devices can include a visual display. In some embodiments, the display is a cathode ray tube (CRT) or an optical projector, but is increasingly an flat screen such as a liquid crystal display (LCD), a plasma display, a thin film transistor liquid crystal display (TFT-LCD), a light emitting diode (LED) or an organic light emitting diode. In other embodiments, the display can also be a combination of devices such as those disclosed herein.

The digital processing device can also include one or more an input devices or features. In some embodiments, the input device is a keyboard or keypad but these can also include a pointing device such as, by way of non-limiting examples, a mouse, touchpad, light pen, pointing stick, trackball, track pad, joystick, game controller, stylus, touch screen, multi-touch screen, a microphone that captures voice or other sound inputs or an optical image capture device that can capture images or motion or other visual input. In still further embodiments, the input device is a combination of devices such as those disclosed herein.

In some embodiments, the digital processing device optionally includes one or more sound output devices. These sound output devices can be a set of speakers, a pair of headphones, earphones, or ear buds. The speakers can be of any technology including a flat panel loudspeaker, a ribbon magnetic loudspeaker, an electro-acoustic transducer or loudspeaker or a bending wave loudspeaker, or a piezoelectric speaker. In still further embodiments, the sound output device is a combination of devices such as those disclosed herein.

In accordance with the description provided herein, a suitable digital processing device can include, by way of example, server computers, desktop computers, laptop computers, notebook computers, tablet computers, mobile phones such as smart phones, audio devices, personal digital assistants, netbook computers, smartbook computers, sub-notebook computers, ultra-mobile PCs, handheld computers, Internet appliances, and video game systems both portable and fixed.

The systems, platforms, servers, programs, and methods disclosed herein include a digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the computer program and/or mobile application is provided to the digital processing device via the Web. In still further embodiments, the Internet provides access to the World Wide Web and the computer program and/or mobile application is provided to the digital processing device via cloud computing. In other embodiments, the computer network comprises data storage devices including, by way of non-limiting examples, CD-ROMs, DVDs, flash memory devices, solid state memory, magnetic disk drives, magnetic tape drives, optical disk drives, cloud computing systems and services, and the like. In further embodiments, the computer program and/or mobile application is provided to the digital processing device via a data storage device.

In view of the above, it will be seen that the several objects and advantages of the present disclosure have been achieved and other advantageous results have been obtained.

What is claimed is:

1. A method of providing a payment and seller independent electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising:
   a) in a seller digital transaction system communicatively coupled to the seller's purchase payment processing system and independent of a payment means or payment account number thereof and an output interface, performing the steps of:
      storing a seller's digital receipts identifier uniquely identifying the seller from among a plurality of non-related and non-associated sellers;
      receiving a buyer's digital receipt identifier that uniquely identifies the buyer within the digital receipts transaction processing system, the receiving being independent of the payment means or the payment account number used by the buyer to pay the seller for the purchase,
      receiving purchase transaction data from the seller's purchase payment processing system which includes transaction receipt data including data related to the purchased item or items, a price, and payment amount, but which does not include personalized data providing an identity of the buyer,
      assigning a transaction digital receipt number to the received purchase transaction data that uniquely identifies the seller and the purchase transaction,
      formatting a digital transaction receipt including the assigned transaction digital receipt number, the received seller's digital receipt identifier, the buyer's digital receipt identifier, and the transaction receipt data, and
      transmitting the digital transaction receipt over the output interface; and
   b) in a digital receipts transaction processing system having a seller input interface communicatively coupled to an output interface and receiving a transmitted digital transaction receipt that is independent of a payment means or payment account number thereof, a buyer digital receipt output interface communicatively coupled to a buyer digital receipt memory store dedicated and unique to the buyer and identified by a buyer's digital receipt identifier that is independent of the payment means or payment account number thereof, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of:
      transmitting, in near real time to receipt of the digital transaction receipt, a copy of the received digital transaction receipt to either the buyer's e-contact address or the seller digital transaction system;
      receiving, within a transaction window a buyer's purchase receipt, a confirmation message from the buyer's e-contact address or the seller digital transaction system in response to the transmitted digital transaction receipt thereto and
      storing the buyer's digital receipt identifier, a buyer e-contact address, and the seller's digital receipts identifier;
      and in response to receiving the confirmation message performing the steps of:
      transmitting a seller confirmation message to the seller digital transaction system,
      transmitting a first copy of the digital transaction receipt to the buyer digital receipt memory over the buyer digital receipt output interface,
      transmitting a second copy of the digital transaction receipt to the seller digital receipt memory over the seller digital receipt output interface, and
      deleting from the digital receipts system memory the received digital transaction receipt.

2. The method of claim 1 wherein in the digital receipts system memory, the steps of:
   storing a multi-layer taxonomy classification system having a plurality of predefined purchase item classification identifiers, and wherein the digital receipts transaction processing system;
   assigning a first level taxonomy classification purchase item identifier to the seller by a type of seller,
   transmitting to the assigned first level taxonomy seller type identifier to the seller digital transaction processing system,
   transmitting to the seller digital transaction processing system at least a portion of the second level predefined purchase item classification identifiers, the portions transmitted to the seller digital transaction processing systems being unique to that seller, but being compatible and consistent within the stored second level predefined purchase item classification identifiers of the digital receipts transaction processing system;
   wherein in the seller digital transaction system:

receiving and storing the transmitted assigned first level taxonomy classification seller type identifier and the portion of the second level predefined purchase item classification identifiers associated therewith; and identifying a second level predefined purchase item classification identifier for each purchased item in each of the received receipt data, wherein formatting the digital transaction receipt includes the assigned second level predefined purchase item classification identifier for one or more of the purchased items within the transaction receipt data.

3. The method of claim 1 wherein the buyer's e-contact address is associated with a mobile device of the buyer, further comprising:

providing a buyer software application for operating on the mobile device of the buyer, wherein the buyer software application hosting a graphical user interface and configuring the mobile device and the mobile device software application for the steps of:

receiving the transmitted copy of the received digital transaction receipt sent by the digital receipt transaction processing system;

visually presenting the received digital transaction receipt in the graphical user interface of the buyer mobile device graphical user interface;

receiving an input from the buyer, in response to the visually presenting, indicating the buyer confirms the received digital transaction receipt; and transmitting a buyer's purchase receipt confirmation message to the digital receipts transaction processing system.

4. The method of claim 3 wherein the buyer software application further presenting to the buyer via the buyer mobile device graphical user interface access to a plurality of digital transaction receipts associated with the buyer, each of which is related to a different buyer purchase transaction and which digital transaction receipts from two or more non-associated sellers and independent of the means used for payment by the buyer.

5. The method of claim 1 wherein the seller digital receipt memory includes an interface accessible by the seller, and in the seller purchase payment processing system further retrieving and analyzing received digital transaction receipts stored in the seller digital receipt memory independent of the means used for payment by the buyer.

6. The method of claim 1 wherein the seller's digital transaction system includes a seller mobile device coupled to the seller's purchase payment processing system and further includes an application program operating a buyer user interface receiving, independent of the means used for payment by the buyer, the buyer's digital receipt identifier from at least one of an RFID chip, a bar code, a QR code, a scan code, a wireless transmission received from a buyers mobile device, or a buyer data entry.

7. The method of claim 1 wherein there are two or more non-associated sellers are communicatively coupled to the seller input interface of the digital receipts transaction processing system, two or more of the coupled non-associated sellers having seller's purchase payment processing systems being not compatible with each other and wherein the digital transaction receipt from the first seller's purchase payment system has a first digital receipt format, and the digital transaction receipt from the second seller's purchase payment system has a second and different digital receipt format, and wherein the digital receipts transaction system includes, in the digital receipts system memory, formats for processing the two different digital receipt formats.

8. The method of claim 1 wherein the seller purchase payment processing system generating a seller transaction receipt (STR) specific to the seller and includes seller or seller purchase payment processing system defined purchase transaction data, the seller digital transaction system receiving and including the same seller purchase transaction data as the seller transaction receipt and wherein the received seller defined purchase transaction data includes at least one buyer receipt message selected from the group of messages consisting of a coupon, a service code, a rebate, a prize, a warranty, a text message, and an advertisement.

9. A method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising:

in a seller digital transaction system communicatively coupled to the seller's purchase payment processing system and independent of a payment means or payment account number thereof and an output interface, performing the steps of:

storing a seller's digital receipts identifier uniquely identifying the seller from among a plurality of non-related and non-associated sellers;

receiving a buyer's digital receipt identifier that uniquely identifies the buyer within the digital receipts transaction processing system, receiving purchase transaction data from the seller's purchase payment processing system which includes transaction receipt data including data related to the purchased item or items, a price, and payment amount, but which does not include personalized data providing an identity of the buyer and is independent of the payment means or the payment account number thereof, assigning a transaction digital receipt number to the received purchase transaction data that uniquely identifies the seller and the purchase transaction, formatting a digital transaction receipt including the assigned transaction digital receipt number, the received seller's digital receipt identifier, the buyer's digital receipt identifier, and the transaction receipt data, and transmitting the digital transaction receipt over the output interface to a digital receipts transaction processing system having a seller input interface for communicatively receiving the transmitted digital transaction receipt.

10. The method of claim 9 wherein the seller's purchase payment processing system is a seller's point-of-sale (POS) system, and wherein the interface between the seller's POS system and the seller digital transaction system is an application programming interface (API).

11. The method of claim 9 wherein the seller's purchase payment processing system is an e-commerce payment system, and wherein the interface between the seller's e-commerce payment system and the seller digital transaction system is an application programming interface (API) and the e-commerce payment system performing the step of hosting a graphical user interface (GUI) on a web or mobile application and wherein receiving the buyers digital receipt identifier includes at least one of receiving over the hosted GUI, prompting the buyer to enter or scan the buyer's digital receipt identifier and receiving an e-commerce operator manual input of the buyers digital receipt identifier.

12. The method of claim 9, further including the seller purchase payment processing system generating a seller transaction receipt (STR) specific to the seller and which includes seller or seller purchase payment processing system defined purchase transaction data, the seller digital transaction system being formatted to receive the seller transaction data of the seller transaction receipt and additional seller transaction data, and formatting the additional seller transaction data within the digital transaction receipt.

13. A method of providing an electronic digitized transaction receipt for a transactional purchase made from two or more non-associated sellers and independent of any seller-specific purchase or point-of-sale processing systems, and further independent of any form of payment used by the buyer to pay the seller for the purchase, the method comprising:
    in a digital receipts transaction processing system having a seller input interface communicatively coupled to an output interface and receiving a transmitted digital transaction receipt that is independent of a payment means or payment account number thereof, a buyer digital receipt output interface communicatively coupled to a buyer digital receipt memory store dedicated and unique to the buyer and identified by a buyer's digital receipt identifier that is independent of the payment means or payment account number thereof, a seller digital receipt output interface communicatively coupled to a seller digital receipt memory store dedicated and unique to the seller and identified by a seller's digital receipt identifier, and a digital receipts system memory storing the buyer's digital receipt identifier and a stored buyer e-contact address, the seller's digital receipts identifier, and computer executable instructions, performing the steps of:
    transmitting, in near real time in response to the receipt of the digital transaction receipt, a copy of the received digital transaction receipt to either the buyer's e-contact address or the seller digital transaction system;
    receiving, within a transaction window a buyer's purchase receipt, confirmation message from the buyer's e-contact address or the seller digital transaction system in response to the transmitted digital transaction receipt thereto;
    and in response to receiving the confirmation message performing the steps of:
    transmitting a seller confirmation message to the seller digital transaction system,
    transmitting a first copy of the digital transaction receipt to the buyer digital receipt memory over the buyer digital receipt output interface,
    transmitting a second copy of the digital transaction receipt to the seller digital receipt memory over the seller digital receipt output interface, and
    deleting from the digital receipts system memory the received digital transaction receipt.

14. The method of claim 13 wherein in the digital receipts transaction processing system or the seller digital receipts memory, providing a seller taxonomy analytics module and a seller analytics interface, each providing non-buyer identifiable purchase taxonomy based analytics over the seller specific analytics interface.

15. The method of claim 13 wherein
    in the buyer digital receipt memory, the step of providing a buyer taxonomy analytics module and a buyer analytics interface providing buyer specific identifiable purchase taxonomy based analytics over the buyer seller specific analytics interface, wherein the seller's digital receipt identifier which uniquely identifies the at least one seller within the digital receipts transaction processing system being subordinate to a supervisory or parent seller digital receipt identifier, and wherein the analytics interface of the at least one seller's digital receipts and taxonomy analytics is accessible by the parent seller digital receipt identifier.

16. The method of claim 13 wherein the digital receipts transaction processing system further including
    storing a multi-layer taxonomy classification system having a plurality of predefined purchase item classification identifiers, and wherein the digital receipts transaction processing system;
    assigning a first level taxonomy classification purchase item identifier to the seller by a type of seller, and
    determining a buyer receipt message selected from the group of messages consisting of a coupon, a service code, a warranty, a rebate, a prize, a test message and an advertisement as a function of the at least a portion of the assigned taxonomy identifiers associated with the digital transaction receipt.

17. The method of claim 13 wherein in the digital receipts transaction processing system further performing the step of transmitting the determined buyer receipt message to the seller digital transaction system or the seller's purchase payment processing system, or to include the determined buyer receipt message within the copies of the digital transaction receipt as transmitted to the buyer digital receipt memory and the seller digital receipt memory.

18. The method of claim 13 wherein at least one of the digital receipts transaction processing system and the buyer digital receipt memory includes a buyer specific analytics interface and a taxonomy analytics module providing buyer-specific identifiable purchase taxonomy based analytics over the buyer specific analytics interface.

19. The method of claim 18 wherein the buyer's e-contact address is associated with a mobile device of the buyer, further comprising:
    providing a buyer software application for operating on the mobile device of the buyer, the buyer software;
    hosting a graphical user interface that includes the buyer specific analytics interface; and
    presenting, on the mobile device via the mobile device software application and its buyer mobile device graphical user interface access, a plurality of digital transaction receipts associated with the buyer, each of which is related to a different buyer purchase transaction and which digital transaction receipts from two or more non-associated sellers.

20. The method of claim 13 wherein the buyer digital receipt memory includes an analytics interface providing data access by the buyer for retrieving and analyzing received digital transaction receipts stored in the buyer's seller digital receipt memory.

21. The method of claim 20 wherein the buyer's digital receipt identifier that uniquely identifies the buyer within the digital receipts transaction processing system is subordinate to a supervisory or parent digital receipt identifier, and wherein in the analytics interface providing the buyers digital receipts and taxonomy analytics also providing access to the buyer analytics by the parent digital receipt identifier.

22. The method of claim 13 wherein the digital receipts transaction processing system includes, in the digital receipts system memory, storing of a plurality of different and unique buyer's digital receipt identifiers, storing a buyer e-contact addresses, and establishing and managing a unique buyer digital receipt memory for each of the buyer's digital receipts identifiers, the digital receipts transaction processing system transmitting and storing the copy of the digital transaction receipts in each buyer digital receipts memory associated with the buyer's digital receipts identifier therefore.

23. The method of claim 13 wherein if during the method thereof the seller digital transaction system fails to receive the buyers digital receipt identification, the seller digital transaction system performs all of the same recited processes but the formatting of the digital transaction receipt not including the buyers digital receipt identifier, and wherein the process within the digital receipts transaction system does not include the steps of transmitting to the buyers e-contact address or receiving a confirmation message, but rather transmits a copy of the received digital transaction receipt only to the seller digital receipt memory and does not include transmitting a copy to the buyer digital receipt memory as an orphan digital transaction receipt.

24. The method of claim 23 wherein the digital receipts transaction processing system subsequently performing the steps of:
receiving a buyers digital receipt identification associated with the assigned transaction digital receipt number,
and wherein, in the digital receipts transaction processing system,
updating the copy of the digital transaction receipt stored within the seller digital receipt memory; and
transmitting a copy of the updated copy of the digital transaction receipt to the buyer digital receipt memory associated with the received buyers digital receipt identification.

* * * * *